US012749430B2

(12) United States Patent
Lee et al.

(10) Patent No.: US 12,749,430 B2

(45) Date of Patent: Sep. 29, 2026

(54) ELECTRONIC DEVICE INCLUDING DISPLAY DRIVER CIRCUIT ADAPTIVELY STORING IMAGE

(71) Applicant: Samsung Electronics Co., Ltd., Suwon-si (KR)

(72) Inventors: Jaesung Lee, Suwon-si (KR); Jongkon Bae, Suwon-si (KR); Kyounghwan Kwon, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 19/204,212

(22) Filed: May 9, 2025

(65) Prior Publication Data

US 2025/0265969 A1 Aug. 21, 2025

Related U.S. Application Data

(63) Continuation of application No. 18/487,669, filed on Oct. 16, 2023, now Pat. No. 12,300,148, which is a (Continued)

(30) Foreign Application Priority Data

Sep. 30, 2022 (KR) ........................ 10-2022-0125365
Jan. 4, 2023 (KR) ........................ 10-2023-0001471

(51) Int. Cl.
*G09G 3/20* (2006.01)
*G09G 3/3208* (2016.01)

(52) U.S. Cl.
CPC ......... *G09G 3/2096* (2013.01); *G09G 3/3208* (2013.01); *G09G 2320/0257* (2013.01); *G09G 2340/0435* (2013.01)

(58) Field of Classification Search
CPC ............... G09G 3/2096; G09G 3/3208; G09G 2320/0257; G09G 2340/0435;
(Continued)

(56) References Cited

U.S. PATENT DOCUMENTS 5,948,091 A 9/1999 Kerigan
7,387,682 B2 6/2008 Miura
(Continued)

FOREIGN PATENT DOCUMENTS

JP 7387682 11/2023
KR 10-2010-0025095 3/2010
(Continued)

OTHER PUBLICATIONS

International Search Report dated Jan. 11, 2024 in International Patent Application No. PCT/KR2023/014711.
(Continued)

*Primary Examiner* — Premal R Patel
(74) *Attorney, Agent, or Firm* — Nixon & Vanderhye, P.C.

(57) ABSTRACT

An example electronic device includes a display panel; a display driver circuit operably coupled to the display panel and including a memory; and a processor operably coupled to the display driver circuit. The processor may be configured to identify a refresh rate; provide, to the display driver circuit, a first signal that indicates storing in the memory one or more images to be provided from the processor for a display on the display panel according to the refresh rate, or provide, to the display driver circuit, a second signal that indicates bypassing to store the one or more images in the memory.

11 Claims, 24 Drawing Sheets

Related U.S. Application Data continuation of application No. PCT/KR2023/014711, filed on Sep. 25, 2023.

(58) Field of Classification Search

CPC ............... G09G 5/006; G09G 2310/08; G09G 2320/103; G09G 2330/021; G09G 2360/18; G09G 3/20; G09G 5/12; G09G 2354/00; G09G 5/003

See application file for complete search history.

(56) References Cited

U.S. PATENT DOCUMENTS

| | | | | |
|---|---|---|---|---|
| 8,451,279 | B2 | 5/2013 | Gorla | |
| 8,878,995 | B2 | 11/2014 | Cha | |
| 9,704,215 | B2 | 7/2017 | Kim et al. | |
| 9,830,880 | B1 | 11/2017 | Wyatt | |
| 10,062,314 | B2 | 8/2018 | Lee | |
| 10,614,772 | B2 | 4/2020 | Zhao et al. | |
| 10,810,927 | B2 | 10/2020 | Lee | |
| 11,087,721 | B2 | 8/2021 | Kim | |
| 11,270,615 | B2 | 3/2022 | Choi | |
| 11,412,173 | B2 | 8/2022 | Yamamoto | |
| 11,501,734 | B2 | 11/2022 | Han | |
| 11,721,272 | B2 | 8/2023 | Lee | |
| 12,018,403 | B2 | 6/2024 | Vasquez | |
| 12,062,316 | B2 | 8/2024 | Kim | |
| 2010/0053182 | A1 | 3/2010 | Jeon | |
| 2013/0235055 | A1 | 9/2013 | Kim et al. | |
| 2014/0198021 | A1 | 7/2014 | Tu | |
| 2015/0029201 | A1 | 1/2015 | Cha et al. | |
| 2016/0027146 | A1* | 1/2016 | Kim ..................... | G09G 3/3208 345/82 |
| 2016/0078846 | A1 | 3/2016 | Liu | |
| 2017/0193971 | A1 | 7/2017 | Bi | |
| 2020/0066226 | A1* | 2/2020 | Han ....................... | G09G 5/006 |
| 2021/0312871 | A1 | 10/2021 | Park et al. | |
| 2022/0189408 | A1 | 6/2022 | Jo | |
| 2024/0038172 | A1 | 2/2024 | Sang | |

FOREIGN PATENT DOCUMENTS

| | | |
|---|---|---|
| KR | 10-1158876 | 6/2012 |
| KR | 10-2013-0027094 | 3/2013 |
| KR | 10-2013-0036783 | 4/2013 |
| KR | 10-2016-0115476 | 10/2016 |
| KR | 10-2017-0064292 | 6/2017 |
| KR | 10-1885331 | 8/2018 |
| KR | 10-2018-0118209 | 10/2018 |
| KR | 10-2019-0109587 | 9/2019 |
| KR | 10-2020-0064867 | 6/2020 |
| KR | 10-2021-0017468 | 2/2021 |
| KR | 10-2021-0028793 | 3/2021 |
| KR | 10-2305765 | 9/2021 |
| KR | 10-2022-0006729 | 1/2022 |
| KR | 10-2022-0048409 | 4/2022 |
| KR | 10-2022-0083421 | 6/2022 |
| KR | 10-2022-0088213 | 6/2022 |

OTHER PUBLICATIONS

Written Opinion dated Jan. 11, 2024 in International Patent Application No. PCT/KR2023/014711.

Lee et al., U.S. Appl. No. 18/487,669, filed Oct. 16, 2023.

Extended Search Report dated Aug. 21, 2025 in European Patent Application No. 23873045.1.

* cited by examiner

ELECTRONIC DEVICE INCLUDING DISPLAY DRIVER CIRCUIT ADAPTIVELY STORING IMAGE

CROSS-REFERENCE TO RELATED APPLICATIONS

This application is a continuation application of U.S. application Ser. No. 18/487,669, filed Oct. 16, 2023, which is a continuation application of International Application No. PCT/KR2023/014711 designating the United States, filed on Sep. 25, 2023, in the Korean Intellectual Property Receiving Office and claiming priority to Korean Patent Application No. 10-2022-0125365, filed on Sep. 30, 2022, in the Korean Intellectual Property Office and to Korean Patent Application No. 10-2023-0001471, filed on Jan. 4, 2023, in the Korean Intellectual Property Office. The disclosures of each of these applications are incorporated by reference herein in their entireties.

BACKGROUND

Field

The following descriptions relate to an electronic device including a display driver circuit adaptively storing an image.

Description of Related Art

An electronic device may include a display panel. For example, the electronic device may include a display driver circuit operably coupled with the display panel. For example, the display driver circuit may display an image obtained from a processor of the electronic device on the display panel.

The above-described information may be provided as related art for the purpose of helping to understand the present disclosure. No claim or determination is raised as to whether any of the above-described information can be applied as a prior art related to the present disclosure.

SUMMARY

An electronic device is provided. The electronic device may include a display panel. The electronic device may include a display driver circuit operably coupled to the display panel and including a memory. The electronic device may include a processor operably coupled to the display driver circuit. The display driver circuit may be configured to display a first image obtained from the processor on the display panel in a first time interval. The display driver circuit may be configured to store in the memory the first image obtained from the processor in the first time interval, based on the first image to be maintained on the display panel in a second time interval next to the first time interval. The display driver circuit may be configured to bypass storing the first image in the memory in the first time interval, based on the first image to be changed to the second image in the second time interval.

An electronic device is provided. The electronic device may include a switch. The electronic device may include a display panel. The electronic device may include a processor. The electronic device may include a display driver circuit operably coupled with the display panel 340 and including a memory connectable with the processor through the switch. The display driver circuit may be configured to display the first image obtained from the processor on the display panel. The display driver circuit may be configured to store the first image in the memory, based on connecting the processor and the memory through the switch while the first image is obtained from the processor. The display driver circuit may be configured to bypass storing the first image in the memory, based on disconnecting the memory from the processor through the switch while the first image is obtained from the processor.

An electronic device is provided. The electronic device may include a display panel. The electronic device may include a display driver circuit operably coupled to the display panel and including a memory. The electronic device may include a processor operably coupled to the display driver circuit. The processor may be configured to identify refresh rate. The processor may be configured to provide, to the display driver circuit, a first signal that indicates storing one or more images to be provided from the processor for a display on the display panel according to the refresh rate in the memory, in response to the refresh rate lower than reference refresh rate. The processor may be configured to provide, to the display driver circuit, a second signal that indicates bypassing to store the one or more images in the memory, in response to the refresh rate higher than or equal to the reference refresh rate.

An electronic device is provided. The electronic device may include a display panel. The electronic device may include a display driver circuit operably coupled to the display panel and including a memory. The electronic device may include a processor operably coupled to the display driver circuit. The processor may be configured to identify refresh rate. The processor may be configured to provide, to the display driver circuit, a first signal that indicates storing one or more images to be provided from the processor for a display on the display panel according to the refresh rate in the memory, or provide, to the display driver circuit, a second signal that indicates bypassing to store the one or more images in the memory.

DETAILED DESCRIPTION

An electronic device may include a processor, a display driver circuit, and a display panel. For example, the display driver circuit may display an image obtained by the processor on the display panel. For example, the display driver circuit may display the image on the display panel based on a first mode or a second mode.

For example, the first mode may indicate a mode for displaying an image through a memory (e.g., graphical random access memory (GRAM)) in the display driver circuit. For example, the display driver circuit may display the image on the display panel, based on the first mode, by storing data obtained from the processor and for displaying the image in the memory and scanning the data stored in the memory. For example, the first mode may indicate a command mode of a display serial interface (DSI). The first mode will be illustrated with reference to FIG. 1.

For example, unlike the first mode, the second mode may indicate a mode for displaying an image without using the memory. For example, the second mode may indicate a mode provided by a display driver circuit that does not include memory. For example, the display driver circuit may display an image obtained from the processor on the display panel based on the second mode. For example, the second mode may indicate a video mode of the DSI. The second mode will be illustrated with reference to FIG. 2.

Figure 1:
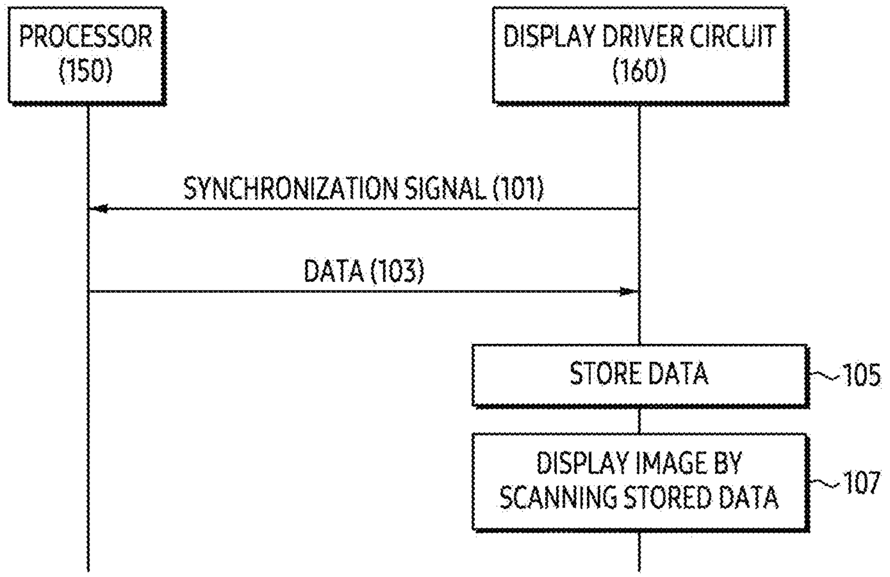
FIG. 1 illustrates an example of a first mode.

FIG. 1 illustrates an example of a first mode.

Referring to FIG. 1, in operation 101, a display driver circuit 160 may provide a synchronization signal to a processor 150 for the first mode. For example, the synchronization signal may be provided from the display driver circuit 160 to the processor 150 to identify timing when the processor 150 provides an image to the display driver circuit 160. For example, the synchronization signal may be provided to the processor 150 from the display driver circuit 160, to identify timing of storing (or writing) data obtained from the processor 150 and for displaying an image in a memory within the display driver circuit 160. For example, since a state of the display driver circuit 160 (or a state of the memory) is not recognized by the processor 150 within the first mode, the display driver circuit 160 may provide the synchronization signal to the processor 150. For example, the synchronization signal may be a tearing effect (TE) signal. For example, the processor 150 may obtain the synchronization signal from the display driver circuit 160.

In operation 103, the processor 150 may provide data for displaying the image obtained by the processor 150 to the display driver circuit 160, in response to the synchronization signal. For example, the display driver circuit 160 may obtain the data from the processor 150.

In operation 105, the display driver circuit 160 may store or record the data in the memory.

In operation 107, the display driver circuit 160 may display the image on the display panel by scanning the data stored in the memory.

Figure 2:
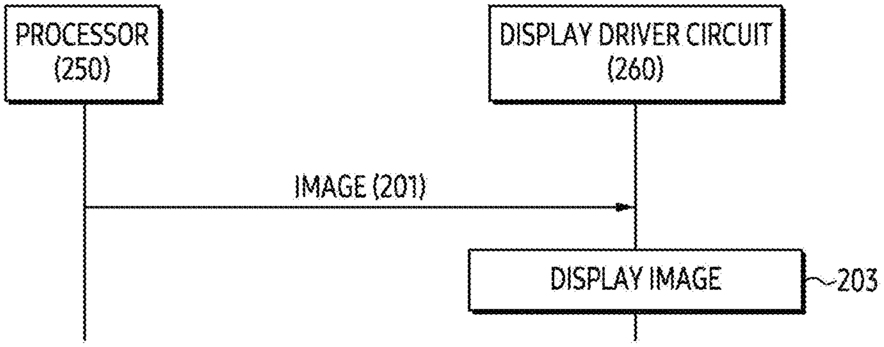
FIG. 2 illustrates an example of a second mode.

As described above, the first mode may further include storing the data in the memory by the display driver circuit 160 as in operation 105 and scanning the data stored in the memory by the display driver circuit 160 as in operation 107, compared to the second mode to be illustrated in FIG. 2. For example, the first mode may cause additional power consumption by storing the data and scanning the data, compared to the second mode.

For example, an image newly obtained within the first mode may be provided from the processor 150 to the display driver circuit 160 in response to the synchronization signal from the display driver circuit 160 to the processor 150. On the other hand, an image newly obtained within the second mode may be provided to a display driver circuit (e.g., a display driver circuit 260 to be illustrated in FIG. 2) based on timing identified by a processor (e.g., a processor 250 to be illustrated in FIG. 2). For example, the first mode may have lower responsiveness than the second mode.

FIG. 2 illustrates an example of a second mode.

Referring to FIG. 2, in operation 201, a processor 250 may provide an image to a display driver circuit 260 for the second mode. For example, unlike the first mode illustrated in FIG. 1, the processor 250 may provide the image to the display driver circuit 260 based on timing identified by the processor 250. For example, throughput of transmission from the processor 250 to the display driver circuit 260 in operation 201 may be less than throughput of transmission from the processor 150 to the display driver circuit 160 in operation 103 of FIG. 1. For example, unlike the transmission from the processor 250 to the display driver circuit 260 in operation 201, the transmission from the processor 150 to the display driver circuit 160 within the first mode may be data burst transmission. For example, the display driver circuit 260 may obtain the image from the processor 250.

In operation 203, the display driver circuit 260 may display the image obtained from the processor 250 on the display panel.

As described above, unlike the first mode, the second mode may be provided through a display driver circuit 260 that does not include the memory or does not use the memory. For example, since the second mode is provided without using the memory, the second mode may cause greater power consumption than the first mode when an image displayed on the display panel is continuously maintained. For example, unlike the first mode in which the display driver circuit 160 may continuously maintain the image displayed on the display panel by repeatedly scanning the data stored in the memory, the processor 250 may repeatedly transmit the image to the display driver circuit 260 within the second mode to continuously maintain the image displayed on the display panel. For example, since the processor 250 executes repetitive transmission in the second mode, the second mode may cause greater power consumption than the first mode when the image displayed on the display panel is continuously maintained.

The electronic device to be illustrated below may include a display driver circuit that adaptively stores an image for the second mode. For example, the electronic device may reduce the power consumed by displaying the image, based on storing the image in the memory in the display driver circuit when the image displayed on the display panel is continuously maintained. Components of the electronic device may be illustrated in FIG. 3.

Figure 3:
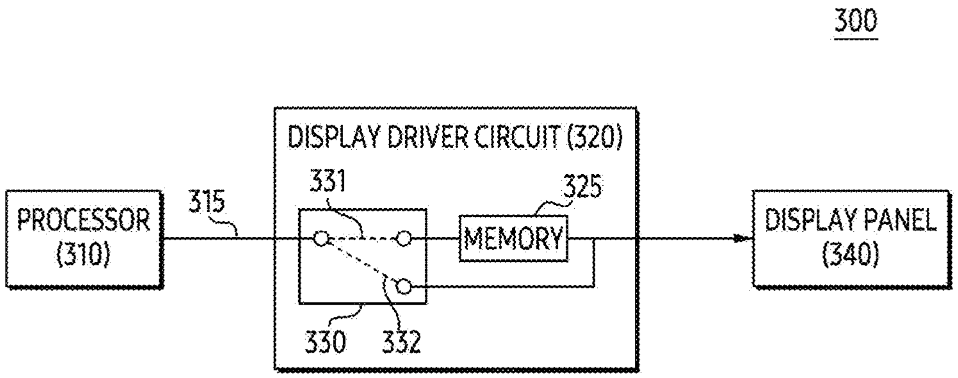
FIG. 3 is a simplified block diagram of an exemplary electronic device.

FIG. 3 is a simplified block diagram of an exemplary electronic device.

Referring to FIG. 3, an electronic device 300 may include a processor 310, a display driver circuit 320, and a display panel 340.

Figure 23:
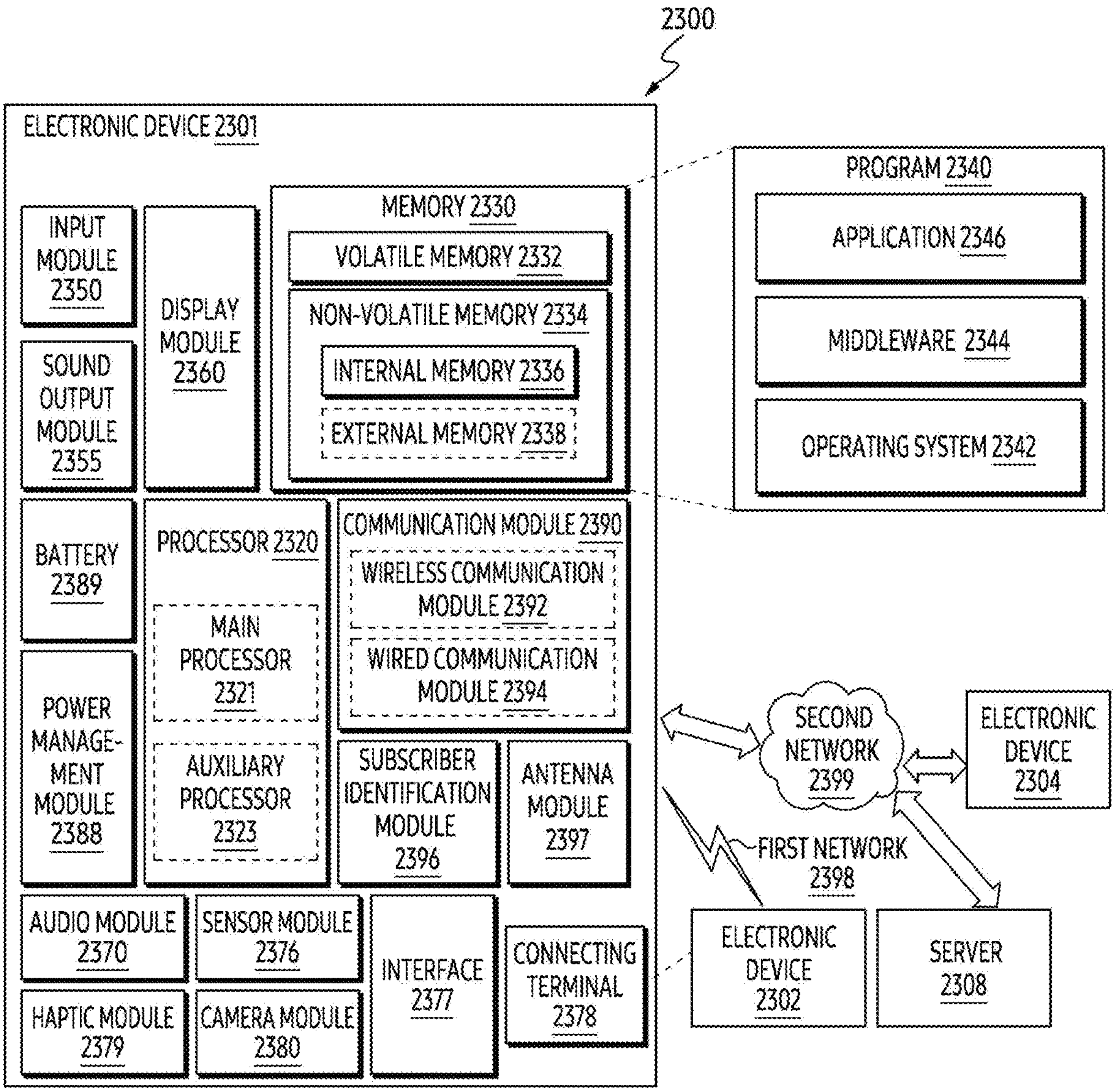
FIG. 23 is a block diagram of an electronic device in a network environment according to various embodiments.

For example, the processor 310 may include at least a portion of the processor 2320 of FIG. 23. For example, the processor 310 may be connected to the display driver circuit 320 through an interface 315. For example, the interface 315 may be used to provide an image from the processor 310 to the display driver circuit 320. For example, the processor 310 may be operably coupled to the display driver circuit 320 through the interface 315. As a non-limiting example, the interface 315 may include a mobile industry processor interface (MIPI).

Figure 24:
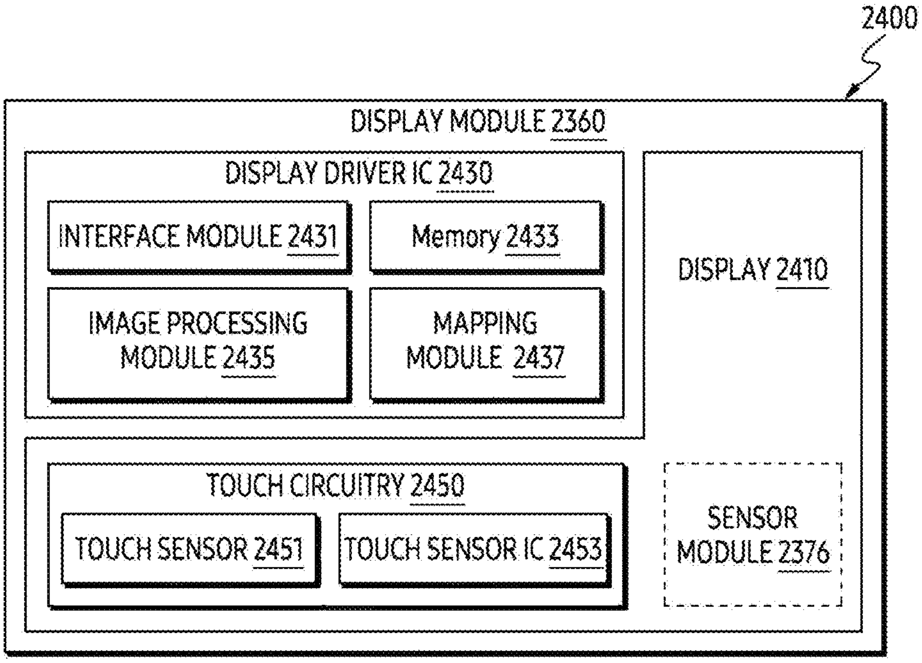
FIG. 24 is a block diagram of a display module according to various embodiments.

For example, the display driver circuit 320 may include at least a portion of the display driver integrated circuit (IC) 2430 of FIG. 24. For example, the display driver circuit 320 may include a memory 325. For example, the memory 325 may include at least a portion of the memory 2433 of FIG. 24. For example, the display driver circuit 320 may further include a switch 330. For example, the memory 325 may be connectable to the processor 310 through the switch 330. For example, the memory 325 may be connected to the processor 310 through the switch 330 in a first state 331. For example, the memory 325 may be disconnected from the processor 310 through the switch 330 in a second state 332.

FIG. 3 illustrates an example in which the switch 330 is included in the display driver circuit 320, but the switch 330 may be located outside the display driver circuit 320, unlike illustrated in FIG. 3. However, it is not limited thereto.

For example, the display panel 340 may include at least a portion of the display 2410 of FIG. 24. For example, the display panel 340 may include a low temperature polycrystalline oxide thin film transistor (LTPO TFT) or a low temperature poly-silicon (LTPS TFT). However, it is not limited thereto. For example, the display panel 340 may be operably coupled to the display driver circuit 320.

For example, the processor 310 and the display driver circuit 320 may be configured to perform operations to be illustrated below.

Figure 4:
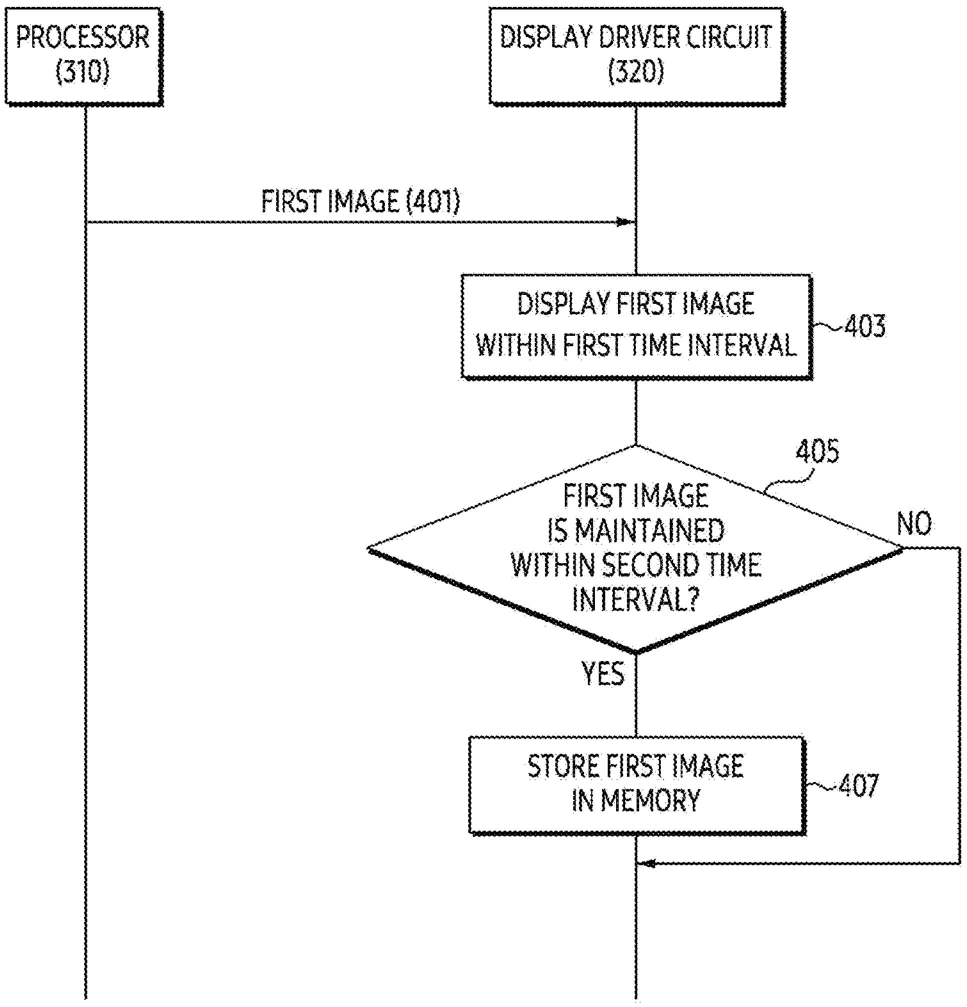
FIG. 4 illustrates an exemplary method of adaptively storing a first image.

FIG. 4 illustrates an exemplary method of adaptively storing a first image. This method may be executed by the processor 310 and the display driver circuit 320 of FIG. 3.

Referring to FIG. 4, in operation 401, the processor 310 may provide a first image to the display driver circuit 320 within a first time interval. For example, the first image may be transmitted from the processor 310 to the display driver circuit 320 based on the second mode. For example, the first time interval may correspond to a period of a vertical synchronization signal. For example, the first time interval may correspond to refresh rate for the first image. For example, the refresh rate for the first image may indicate a frequency targeted (or identified) for displaying the image when obtaining or rendering the first image. For example, the first time interval may be a time interval identified for the first image when the first image is obtained or rendered.

In operation 403, the display driver circuit 320 may display the first image obtained from the processor 310 within the first time interval on the display panel 340. For example, the display driver circuit 320 may display the first image on the display panel 320 based on the second mode. For example, displaying the first image obtained from the processor 310 within the first time interval may include displaying the first image obtained from the processor 310 within at least a portion of the first time interval. However, it is not limited thereto.

In operation 405, the display driver circuit 320 may identify whether the first image is maintained on the display panel 340 within the second time interval next to (subsequent to) the first time interval. For example, the identification may be performed based on a predetermined signal 550 to be illustrated through FIG. 5, a predetermined signal 650 to be illustrated through FIG. 6, and/or a predetermined signal 1450 to be illustrated through FIG. 14. However, it is not limited thereto. The predetermined signal 450, the predetermined signal 650, and/or the predetermined signal 1450 may be referred to, for example, as a still indication. For example, the still indication comprises a sticky flag indication (or sticky flag) and/or an on-the-fly indication (or on-the-fly).

For example, the display driver circuit 320 may execute operation 407 based on identifying that the first image is to be maintained on the display panel 340 within the second time interval, and bypass executing operation 407 based on identifying that the first image is to be changed to a second image within the second time interval.

FIG. 4 illustrates an example in which operation 405 is executed after operation 401 and operation 403 are executed, but operation 405 may be executed before operation 401 is executed. For example, identifying whether the first image is maintained on the display panel 340 within the second time interval may be executed within a third time interval before the first time interval. For example, identifying whether the first image is maintained on the display panel 340 within the second time interval may be executed within the third time interval before the first time interval. For example, the identification of operation 405 may be performed based on a predetermined signal provided from the processor 310 to the display driver circuit 320. For example, the predetermined signal may be received within the third time interval. For example, the predetermined signal may be provided from the processor 310 to the display driver circuit 320 through a front porch portion of the vertical synchronization signal for displaying the first image. For example, the predetermined signal may indicate that the first image to be displayed on the display panel 340 within the first time interval is to be maintained within the second time interval.

For example, the predetermined signal may indicate that the first image to be displayed on the display panel 340 within the first time interval is to be changed to a second image within the second time interval. For example, the display driver circuit 320 may execute operation 407, based on obtaining the predetermined signal indicating that the first image is to be maintained within the second time interval from the processor 310 before the first image is obtained. As a non-limiting example, the predetermined signal may be obtained from the processor 310 through the front porch portion of the vertical synchronization signal for displaying the first image. For example, the display driver circuit 320 may bypass executing operation 407, based on obtaining the predetermined signal indicating that the first image is to be changed to the second image within the second time interval from the processor 310 before the first image is obtained. As a non-limiting example, the predetermined signal may be obtained from the processor 310 through the front porch portion of the vertical synchronization signal for displaying the first image. For example, the display driver circuit 320 may bypass executing operation 407, based on identifying that the predetermined signal indicating that the first image is to be maintained within the second time interval is not obtained from the processor 310 before the first image is obtained. However, it is not limited thereto.

In operation 407, the display driver circuit 320 may store the first image in the memory 325, on a condition that the first image is to be maintained on the display panel 340 within the second time interval. For example, storing the first image in the memory 325 may be initiated from timing identified by the processor 310 among the processor 310 and the display driver circuit 320. For example, storing the first image in the memory 325 may be performed based on the timing identified by the processor 310, unlike operation 103 of FIG. 1, which is executed in response to a synchronization signal from the display driver circuit. Storing the first image in the memory 325 may be illustrated with reference to FIG. 5.

Figure 5:
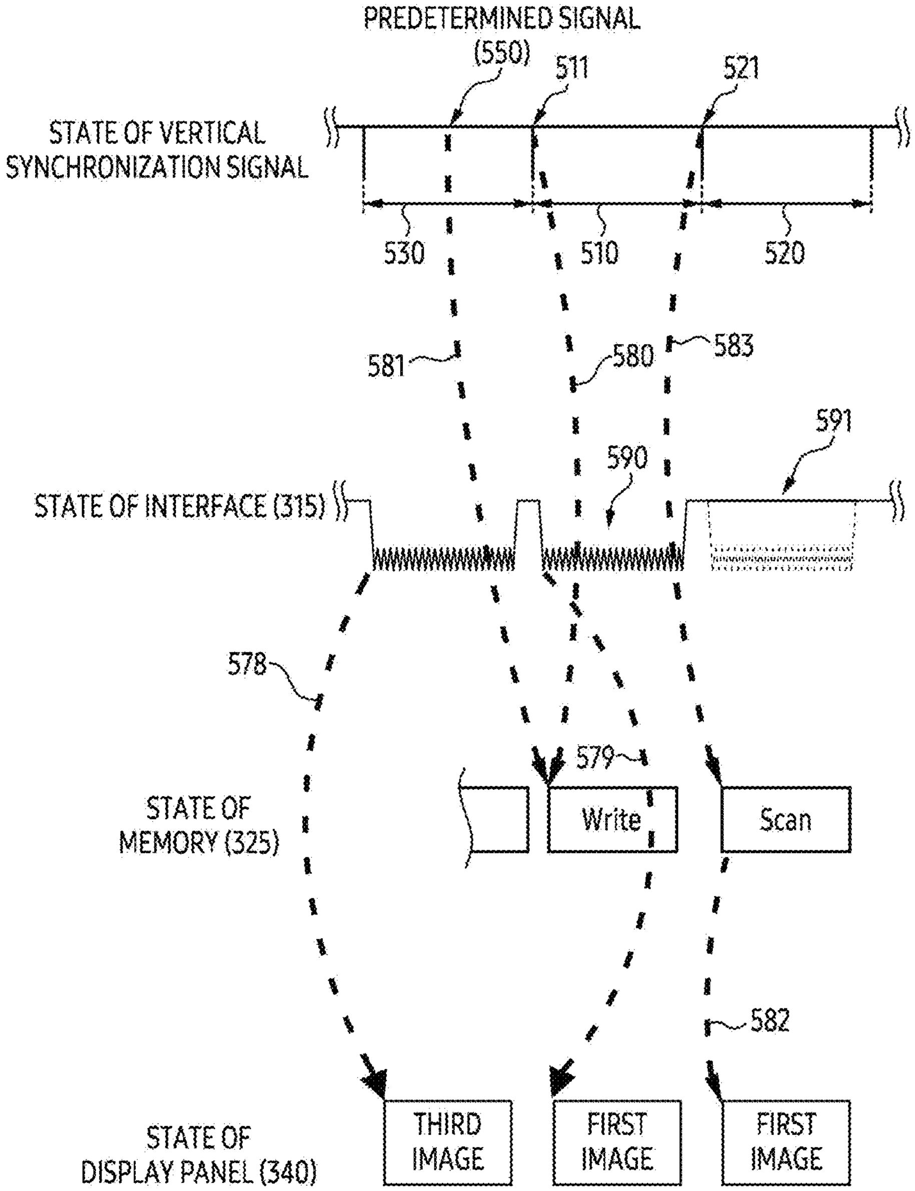
FIG. 5 illustrates an example of storing a first image.

FIG. 5 illustrates an example of storing a first image.

Referring to FIG. 5, the display driver circuit 320 may obtain the first image from the processor 310 through the interface 315 within a first time interval 510 corresponding to a period of the vertical synchronization signal. For example, a state of the interface 315 may be indicated such as a state 590, according to the first image transmitted from the processor 310 to the display driver circuit 320 within the first time interval 510. For example, as indicated by arrow 579, the display driver circuit 320 may display the first image obtained through the interface 315 from the processor 310 on the display panel 340 based on the vertical synchronization signal (or an initiate timing 511 of the vertical synchronization signal).

For example, the display driver circuit 320 may store or record the first image obtained from the processor 310 in the memory 325, based on identifying that the first image is to be maintained within a second time interval 520 next to (subsequent to) the first time interval 510. For example, storing the first image in the memory 325 may be executed based on the initiate timing 511 of the vertical synchronization signal, such as indicated by arrow 580.

For example, identifying that the first image is to be maintained within the second time interval 520 may be executed within a third time interval 530 before the first time interval 510. For example, the processor 310 may provide the predetermined signal 550 indicating that the first image to be displayed from the first time interval 510 is to be maintained on the display panel 340 to the display driver circuit 320, within the third time interval 530. For example, the predetermined signal 550 may be obtained from the processor 310 through the front porch portion of the vertical synchronization signal for displaying the first image. For example, the predetermined signal 550 obtained from the processor 310 through the front porch portion may indicate that the first image is stored or recorded in the memory 325. For example, storing the first image may be identified based on storage location (e.g., address of register) of the predetermined signal 550 obtained from the processor 310 through the front porch portion. However, it is not limited thereto. For example, as indicated by arrow 581, the display driver circuit 320 may store the first image obtained from the processor 310 within the first time interval 510 in the memory 325 based on the predetermined signal 550. On the other hand, as indicated by arrow 578, the display driver circuit 320 may display a third image obtained through the interface 315 from the processor 310 within the third time interval 530 on the display panel 340. For example, the predetermined signal 550 may be obtained from the processor 310 while the third image is transmitted from the processor 310 within the third time interval 530. However, it is not limited thereto. For example, the predetermined signal 550 may be obtained from the processor 310 at timing within the third time interval 530 after the transmission of the third image is completed. For example, the predetermined signal 550 may be transmitted from the processor 310 to the display driver circuit 320 based on a diversity scheme. For example, the predetermined signal 550 may be transmitted from the processor 310 based on an address value of each of a plurality of registers in the display driver circuit 320. For example, the processor 310 may provide the predetermined signal 550 to the display driver circuit 320 within the third time interval 530 through multiple transmissions. For example, the multiple transmissions may be performed to increase reception rate of the predetermined signal 550. However, it is not limited thereto.

For example, the predetermined signal 550 may be provided through various methods. For example, among the predetermined signal 550 and a predetermined signal (e.g., a predetermined signal 650 in FIG. 6) to be illustrated below, one predetermined signal may be provided from the processor 310 at every time interval. For another example, the predetermined signal 550 may be provided from the processor 310 in response to identifying that an image is to be maintained on the display panel 340 within two or more time intervals, and not be provided from the processor 310 while the image is maintained on the display panel 340. For example, the processor 310 may control the display driver circuit 320 to bypass storing the image in the memory 325 by providing a predetermined signal 650 to be illustrated below in response to identifying a change in the image. However, it is not limited thereto.

Figure 6:
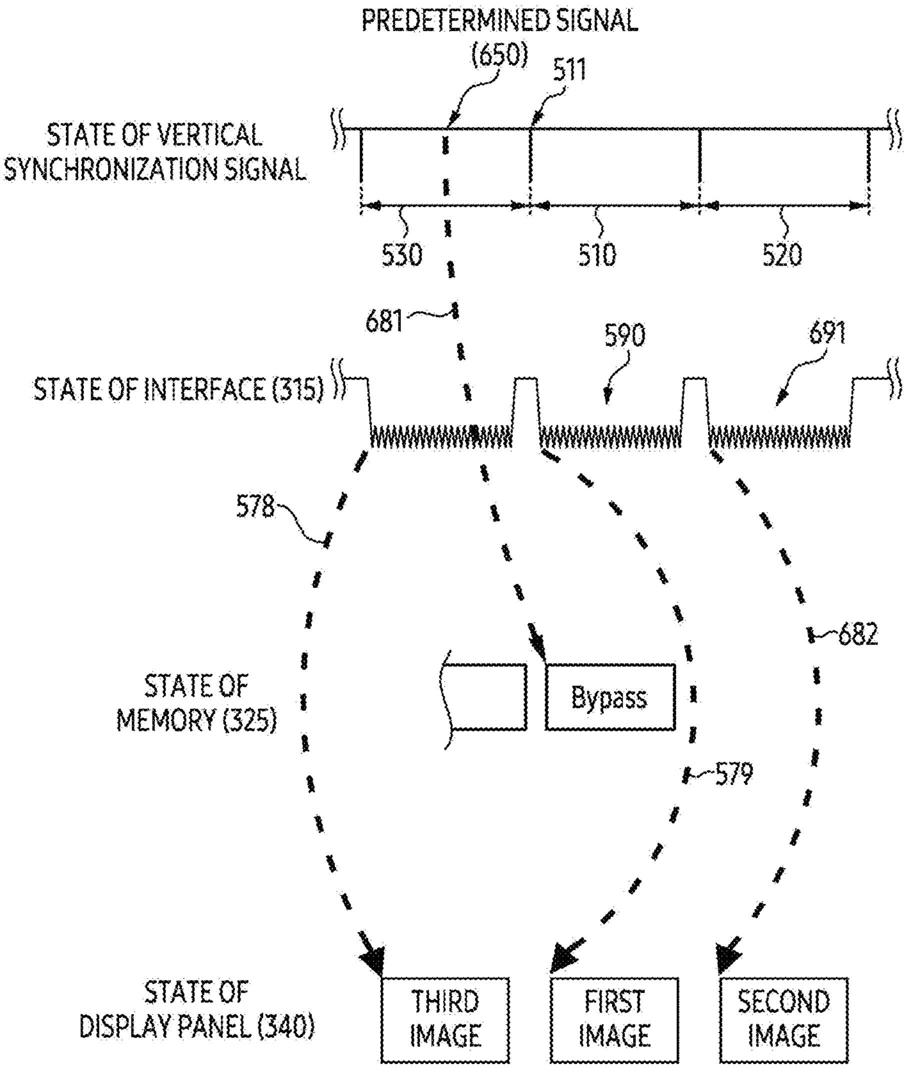
FIG. 6 illustrates an example of bypassing storing a first image.

For example, the predetermined signal 550 may indicate that one or more images provided from the processor 310 to the display driver circuit 320 are stored in the memory 325 until the predetermined signal 650 to be illustrated through FIG. 6 is obtained from the processor 310 after the predetermined signal 550 is obtained. For another example, the predetermined signal 550 may indicate that only an image (e.g., the first image of FIG. 5) obtained after (or immediately after) the predetermined signal 550 is obtained from the processor 310 is stored in the memory 325. However, it is not limited thereto.

For example, as indicated by arrow 582, the display driver circuit 320 may maintain the first image displayed on the display panel 340 within the second time interval 520 by scanning the first image stored in the memory 325 within the second time interval 520. For example, maintaining the first image within the second time interval 520 may indicate that the first image is not changed to another image (e.g., the second image in the example described above). For example, as indicated by arrow 583, the scan may be performed based on a vertical synchronization signal (or an initiate timing 521 of the vertical synchronization signal). On the other hand, the processor 310 may refrain from providing the first image to the display driver circuit 320 within the second time interval 520. For example, a state of the interface 315 within the second time interval 520 may be indicated such as a state 591.

Referring back to FIG. 3, on a condition that the first image displayed on the display panel 340 within the first time interval is to be maintained within the second time interval, the display driver circuit 320 may set a state of the switch 330 to the first state 331 and store the first image in the memory 325 connected to the processor 310 through the switch 330 in the first state 331.

On the other hand, on a condition that the first image displayed on the display panel 340 within the first time interval is to be changed to the second image within the second time interval, the display driver circuit 320 may bypass storing the first image in the memory 325, by setting a state of the switch 330 to the second state 332 and disconnecting the memory 325 from the processor 310 through the switch 330 in the second state 332. Bypassing of storing the first image in the memory 325 may be illustrated with reference to FIG. 6.

FIG. 6 illustrates an example of bypassing storing a first image.

Referring to FIG. 6, the display driver circuit 320 may obtain the first image from the processor 310 through the interface 315 within the first time interval 510 corresponding to a period of the vertical synchronization signal. For example, a state of the interface 315 may be indicated such as the state 590, according to the first image transmitted from the processor 310 to the display driver circuit 320 within the first time interval 510. For example, as indicated by arrow 579, the display driver circuit 320 may display the first image obtained through the interface 315 from the processor 310 on the display panel 340 based on the vertical synchronization signal (or an initiate timing 511 of the vertical synchronization signal).

For example, the display driver circuit 320 may bypass or refrain from storing or recording the first image obtained from the processor 310 in the memory 325, based on identifying that the first image is to be changed to the second image within the second time interval 520 next to (subsequent to) the first time interval 510.

For example, identifying that the first image is to be changed to the second image within the second time interval 520 may be executed within the third time interval 530 before the first time interval 510. For example, identifying that the first image is to be changed to the second image within the second time interval 520 may be executed by identifying that the display driver circuit 320 does not obtain the predetermined signal 550 from the processor 310 within the third time interval 530 before the first time interval 510. For example, identifying that the first image is to be changed to the second image within the second time interval 520 may be executed based on the display driver circuit 320 obtaining the predetermined signal 650 from the processor 310 within the third time interval 530. For example, within the third time interval 530, the processor 310 may provide the display driver circuit 320 with the predetermined signal 650 indicating that the first image to be displayed from the first time interval 510 is changed within the second time interval 520. For example, the predetermined signal 650 may be obtained from the processor 310 through a front porch portion of a vertical synchronization signal for displaying the first image. For example, the predetermined signal 650 obtained from the processor 310 through the front porch portion may indicate bypassing or refraining from storing the first image in the memory 325. For example, bypassing storing the first image may be identified based on a storage location (e.g., address of register) of the predetermined signal 650 obtained from the processor 310 through the front porch portion. For example, an address of the predetermined signal 650 may be different from an address of the predetermined signal 550. However, it is not limited thereto. For example, as indicated by arrow 681, the display driver circuit 320 may bypass storing the first image obtained from the processor 310 in the memory 325 within the first time interval 510, based on the predetermined signal 650. On the other hand, as indicated by arrow 578, the display driver circuit 320 may display the third image obtained through the interface 315 from the processor 310 within the third time interval 530 on the display panel 340. For example, the predetermined signal 650 may be obtained from the processor 310 while the third image is transmitted from the processor 310 within the third time interval 530. However, it is not limited thereto. For example, the predetermined signal 650 may be obtained from the processor 310 at timing within the third time interval 530 after the transmission of the third image is completed. For example, the predetermined signal 650 may be transmitted from the processor 310 to the display driver circuit 320 based on a diversity scheme. However, it is not limited thereto.

For example, as indicated by arrow 682, the display driver circuit 320 may display the second image obtained through the interface 315 from the processor 310 within the second time interval 520 on the display panel 340. For example, a state of the interface 315 may be indicated such as a state 691, according to the second image transmitted from the processor 310 to the display driver circuit 320 within the second time interval 520.

For example, the predetermined signal 650 may be provided through various methods. For example, among the predetermined signal 550 and the predetermined signal 650, one predetermined signal may be provided from the processor 310 at every time interval. For another example, the predetermined signal 650 may be provided from the processor 310 in response to identifying that an image is to be changed on the display panel 340, and not be provided from the processor 310 while the image is to be changed on the display panel 340 every time interval after the predetermined signal 650 is provided from the processor 310. For example, the processor 310 may control the display driver circuit 320 to store an image in the memory 325 by providing the predetermined signal 550 in response to identifying that the image is to be maintained within two or more time intervals. However, it is not limited thereto.

For example, the predetermined signal 650 may indicate that bypassing storing one or more images provided from the processor 310 to the display driver circuit 320 in the memory 325, until the predetermined signal 550 is obtained from the processor 310 after the predetermined signal 650 is obtained. For another example, the predetermined signal 650 may indicate that storing only an image (e.g., the first image of FIG. 6) obtained after (or immediately after) the predetermined signal 650 is obtained from the processor 310 is bypassed in the memory 325. However, it is not limited thereto.

As described above, the display driver circuit 320 in the electronic device 300 may identify whether an image is to be maintained or changed, and store the image obtained from the processor 310 in the memory 325 on a condition that the image is to be maintained. For example, the electronic device 300 may reduce the power consumed for displaying an image during the second mode, by replacing that the processor 310 repeatedly transmitting an image to the display driver circuit 320 with the display driver circuit 320 scanning an image within the memory 325, while the image is maintained.

Figure 7:
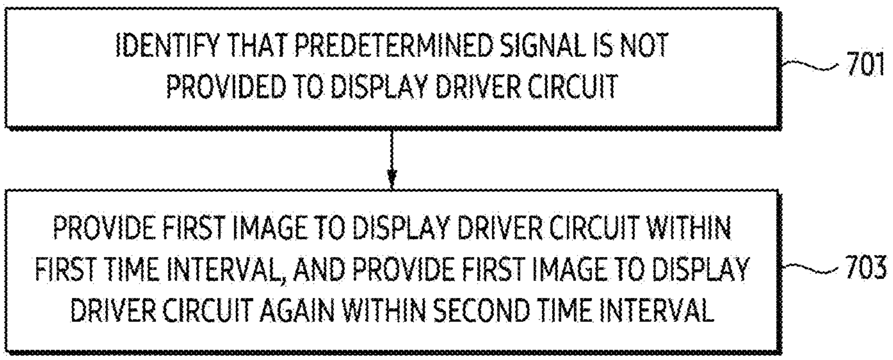
FIG. 7 illustrates an exemplary method of providing again a first image to a display driver circuit.

FIG. 7 illustrates an exemplary method of providing again a first image to a display driver circuit. This method may be executed by the processor 310 of FIG. 3.

Operation 701 and operation 703 of FIG. 7 may be related to the predetermined signal 550 illustrated through the description of FIG. 5.

Referring to FIG. 7, in operation 701, the processor 310 may identify that the predetermined signal, indicating that the first image is to be maintained on the display panel 340 within the second time interval next to (subsequent to) the first time interval, is not provided to the display driver circuit 320. For example, the processor 310 may identify that the first image is to be maintained on the display panel 340 within the second time interval at a first timing within the third time interval before the first time interval. For example, the processor 310 may identify that the predetermined signal is not provided to the display driver circuit 320, based on identifying that a time length between the first timing and a second timing, which is an initiate timing of the first time interval, is shorter than a time length for providing the predetermined signal to the display driver circuit 320. For another example, the processor 310 may identify that the predetermined signal is not provided to the display driver circuit 320, based on identifying that changing a state of the switch 330 to the first state 331 will be executed after transmitting the first image to the display driver circuit 320 is initiated, in response to providing the predetermined signal to the display driver circuit 320 within the third time interval. For still another example, the processor 310 may identify that the predetermined signal is not provided to the display driver circuit 320, based on identifying that a portion of the first image provided from the processor 310 when the predetermined signal is provided to the display driver circuit 320 within the third time interval is not stored in the memory 325. For still another example, the processor 310 may identify that the predetermined signal is not provided to the display driver circuit 320, based on identifying that the predetermined signal is not provided through a front porch portion of a vertical synchronization signal (e.g., corresponding to the first time interval) for displaying the first image. However, it is not limited thereto.

In operation 703, based on the identification in operation 701, the processor 310 may provide the first image to the display driver circuit 320 within the first time interval, and may provide the first image to the display driver circuit 320 again within the second time interval. For example, since the display driver circuit 320 did not obtain the predetermined signal from the processor 310 within the third time interval, the display driver circuit 320 may bypass storing in the memory 325 the first image obtained from the processor 310 within the first time interval for the second time interval, and display the first image obtained from the processor 310 within the first time interval on the display panel 340. For example, since storing the first image within the first time interval is bypassed, the display driver circuit 320 may display the first image provided again from the processor 310 within the second time interval on the display panel 340. For example, the display driver circuit 320 may store the first image provided again from the processor 310 within the second time interval in the memory 325, based on obtaining a predetermined signal indicating to maintain the first image on the display panel 340 within a fourth time interval next to (subsequent to) the second time interval from the processor 310 within the first time interval. For example, the predetermined signal may be provided from the processor 310 to the display driver circuit 320 through a front porch portion of a vertical synchronization signal corresponding to the second time interval. However, it is not limited thereto.

As described above, when the predetermined signal is not provided to the display driver circuit 320, the processor 310 of the electronic device 300 may reduce interruption of a display on the display panel 340 by transmitting the first image to the display driver circuit 320 again.

Figure 8:
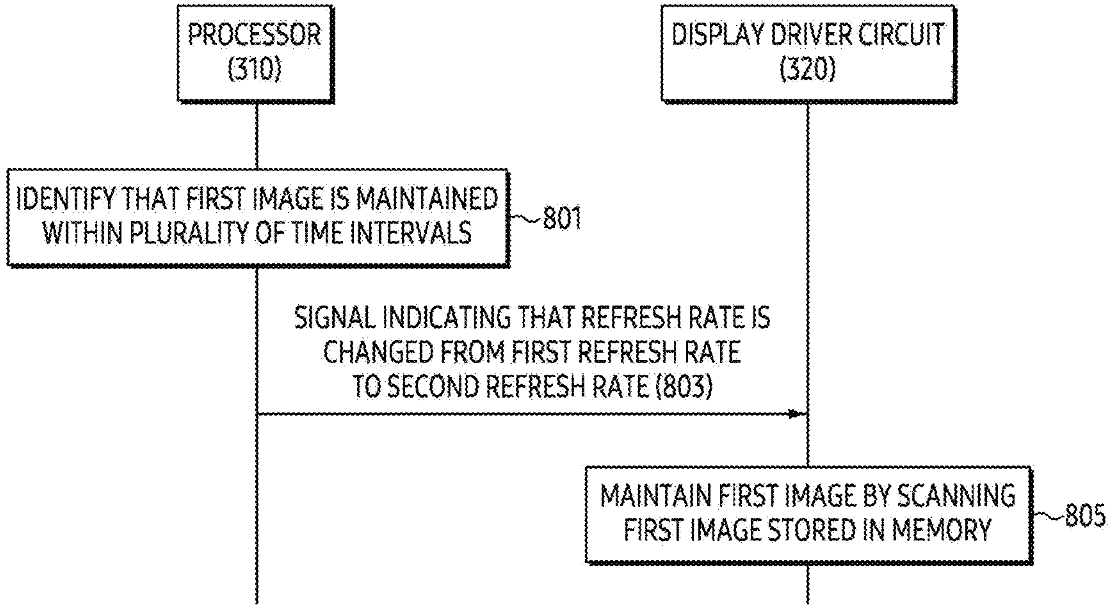
FIG. 8 illustrates an exemplary method of maintaining an image displayed on a display panel after refresh rate is changed.

FIG. 8 illustrates an exemplary method of maintaining an image displayed on a display panel after refresh rate is changed. This method may be executed by the processor 310 and the display driver circuit 320 of FIG. 3.

Referring to FIG. 8, in operation 801, the processor 310 may identify that the first image displayed on the display panel 340 from the first time interval is to be maintained within a plurality of time intervals including the first time interval and a second time interval next to (subsequent to) the first time interval, or identify that the first image will be maintained within the plurality of time intervals. For example, the processor 310 may identify that refresh rate for displaying the first image will be changed from first refresh rate corresponding to each of the plurality of time intervals to second refresh rate lower than the first refresh rate according to the identification.

In operation 803, the processor 310 may provide a signal indicating that the refresh rate is changed from the first refresh rate to the second refresh rate to the display driver circuit 320. For example, the refresh rate is identified by the processor 310 among the processor 310 and the display driver circuit 320 during the second mode, but maintaining the first image on the display panel 340 is executed by scanning the first image stored in the display driver circuit 320, so that the processor 310 may provide the signal to the display driver circuit 320. For example, the signal may be the predetermined signal 550 of FIG. 5. For example, providing the signal to the display driver circuit 320 may indicate that a period of a vertical synchronization signal is changed from a first period to a second period longer than the first period. For example, the signal may indicate a third time interval having a length longer than each of the plurality of time intervals as a time interval next to (subsequent to) the plurality of time intervals. However, it is not limited thereto.

In operation 805, the display driver circuit 320 may maintain the first image on the display panel 340, by scanning the first image stored in the memory 325 within the third time interval based on the signal provided from the processor 310. For example, scanning the first image in operation 805 may be performed based on the second refresh rate. For example, scanning the first image based on the second refresh rate (e.g., 30 hertz (Hz)) may include completing a scan of the first image stored in the memory 325 within a portion (e.g., a time interval corresponding to 120 Hz) of the third time interval corresponding to the second refresh rate. In this case, displaying the first image on the display panel 340 within another portion (e.g., a time interval corresponding to 40 Hz) of the third time interval may be stopped. However, it is not limited thereto.

Although not shown in FIG. 8, the processor 310 may identify that the first image is to be maintained on the display panel 340 within a plurality of other time intervals including the third time interval based on the second refresh rate, and may provide a signal indicating that the second refresh rate will be changed to third refresh rate lower than the second refresh rate to the display driver circuit 320 based on identifying that the first image will be maintained within the plurality of other time intervals. For example, the signal may be the predetermined signal 550 of FIG. 5. For example, in response to the signal, the display driver circuit 320 may maintain the first image on the display panel 340 by scanning the first image stored in the memory 325 based on the third refresh rate. For example, the second refresh rate may be intermediate refresh rate used to reduce flickering caused on the display panel 340 displaying the first image due to a direct change from the first refresh rate to the third refresh rate. For example, the electronic device 300 may reduce twinkling caused on the display panel 340 by changing the first refresh rate to the third refresh rate through the second refresh rate.

Although FIG. 8 illustrates an example in which the processor 310 identifies that the first image is continuously maintained on the display panel 340, identifying that the first image is continuously maintained on the display panel 340 may also be executed by the display driver circuit 320. For example, the display driver circuit 320 may change a period of scanning the first image from the first period to a second period longer than the first period, in response to identifying that a reference time elapses from timing at which the first image is obtained from the processor 310 (or timing at which the first image is stored in the memory 325). For example, the display driver circuit 320 may change a period of scanning the first image from the second period to a third period longer than the second period, in response to identifying that a reference time elapses from timing of scanning the first image based on the second period. As a non-limiting example, the processor 310 may be in a low power state or a sleep state, while the period of scanning the first image is changed from the first period to the third period through the second period.

As described above, on a condition that an image is continuously maintained on the display panel 340, the electronic device 300 may reduce the power consumed for displaying the image by changing a period of scanning an image stored in the memory 325.

Figure 9:
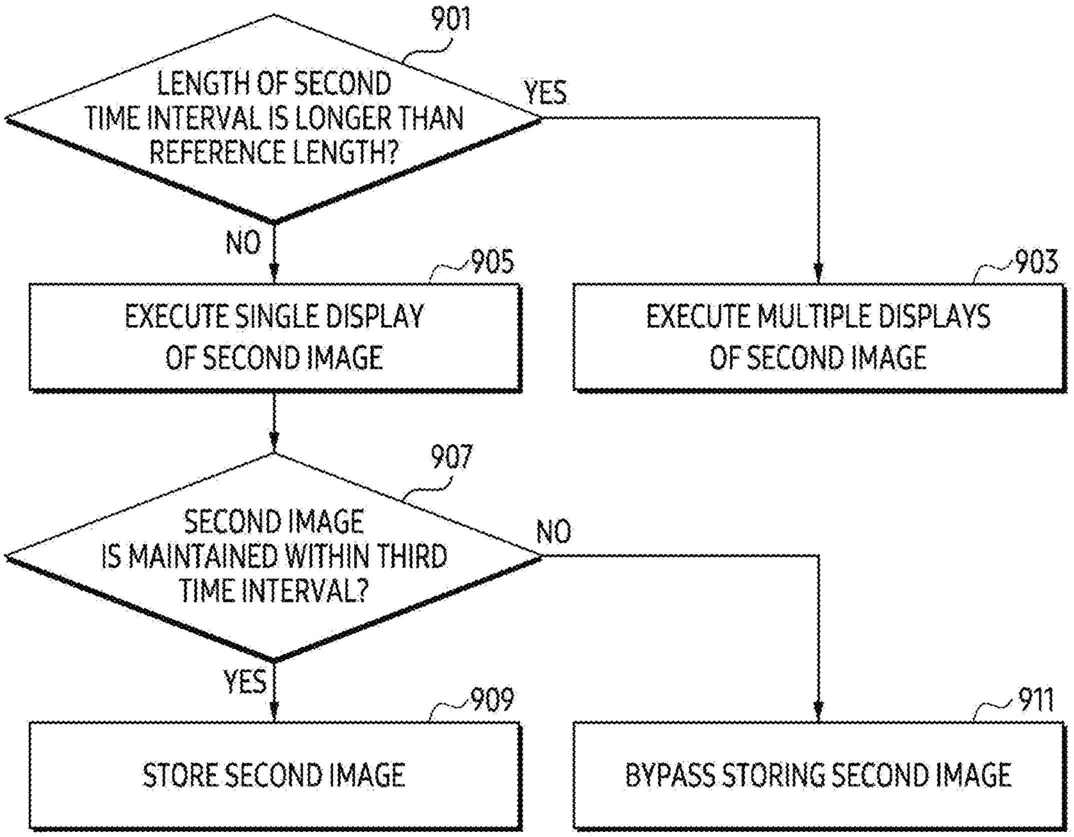
FIG. 9 illustrates an exemplary method of executing a single display of a second image or multiple displays of the second image, according to length of a second time interval.

FIG. 9 illustrates an exemplary method of executing a single display of a second image or multiple displays of the second image, according to length of a second time interval. This method may be executed by the display driver circuit 320 of FIG. 3.

Operation 901 to operation 911 of FIG. 9 to be illustrated below illustrate operations executed in the display driver circuit 320 when displaying the second image changed from the first image in the second time interval illustrated through the description of FIG. 4 on the display panel 340, but it is only for convenience of description. Operation 901 to operation 911 of FIG. 9 may also be applied to display the first image on the display panel 340 within the first time interval illustrated through the description of FIG. 4.

Referring to FIG. 9, in operation 901, the display driver circuit 320 may identify whether a length of the second time interval next to (subsequent to) the first time interval is longer than a reference length. For example, since a probability of causing afterimage due to hysteresis in a driving transistor for driving organic light emitting diode (or sub-pixel) in the display panel 340 may increase as a time length from an end timing of displaying an image to an initiate timing of displaying a next (subsequent) image increases, the display driver circuit 320 may identify whether the length is longer than the reference length. For example, the display driver circuit 320 may execute operation 903 based on the length longer than the reference length, and may execute operation 905 based on the length shorter than or equal to the reference length.

In operation 903, on a condition that the length is longer than the reference length, the display driver circuit 320 may execute multiple displays of the second image on the display panel 340 within the second time interval. For example, the display driver circuit 320 may display the second image obtained from the processor 310 within a portion of the second time interval on the display panel 340 in response to the length being longer than the reference length, and store the second image obtained from the processor 310 within the portion of the second time interval in the memory 325. For example, storing the second image in the memory 325 may be executed independently of whether a predetermined signal indicating that the second image is maintained on the display panel 340 within a third time interval next to (subsequent to) the second time interval is obtained from the processor 310. For example, the display driver circuit 320 may display the second image on the display panel 340, by scanning the second image stored in the memory 325 within another portion of the second time interval after the portion of the second time interval. For example, a first display among the multiple displays may be executed based on obtaining the second image from the processor 310 within the portion of the second time interval, and at least one second display (e.g., at least one display next to (subsequent to) the first display) among the multiple displays may be executed based on scanning the second image stored in the memory 325 within the portion of the second time interval. The multiple displays may be illustrated with reference to FIG. 10.

Figure 10:
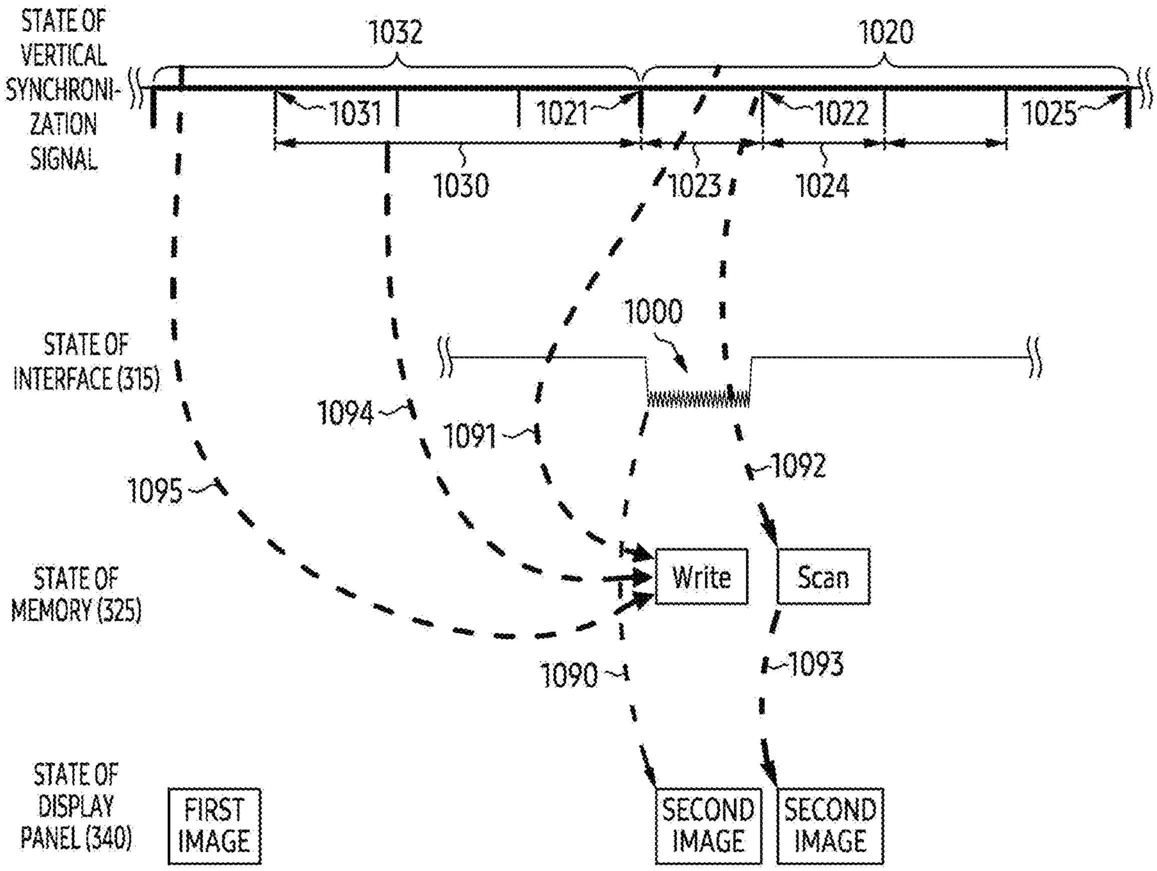
FIG. 10 illustrates an example of executing multiple displays of a second image.

FIG. 10 illustrates an example of executing multiple displays of a second image.

Referring to FIG. 10, the display driver circuit 320 may obtain the second image provided through the interface 315 from the processor 310 based on timing 1021, which is the initiate timing of the second time interval 1020 corresponding to the refresh rate for the second image. For example, a state of interface 315 may be indicated such as a state 1000, according to the second image transmitted from the processor 310 to the display driver circuit 320 within a portion 1023 of the second time interval 1020. As a non-limiting example, the portion 1023 of the second time interval 1020 may correspond to maximum speed of transmission of the second image from the processor 310 executed using the interface 315 to the display driver circuit 320. For example, the maximum speed may indicate maximum speed available through interface 315. For example, as indicated by arrow 1090, the display driver circuit 320 may display the second image obtained from the processor 310 within the portion 1023 of the second time interval 1020 on the display panel 340. For example, a display of the second image within the portion 1023 of the second time interval 1020 may be the first display among the multiple displays.

For example, as indicated by arrow 1091, the display driver circuit 320 may store the second image obtained from the processor 310 within the portion 1023 of the second time interval 1020 in the memory 325, based on the length of the second time interval 1020 being longer than the reference length. For example, storing the second image in the memory 325 may be executed independently of whether a predetermined signal (e.g., the predetermined signal 550 of FIG. 5) is obtained from the processor 310. For example, even when the predetermined signal is not obtained from the processor 310, the display driver circuit 320 may store the second image in the memory 325 based on the length of the second time interval 1020 being longer than the reference length.

For example, as indicated by arrow 1092, the display driver circuit 320 may scan the second image stored in the memory 325, based on timing 1022, which is end timing of the portion 1023 of the second time interval 1020 or initiate timing of another portion 1024 of the second time interval 1020. For example, the other portion 1024 of the second time interval 1020 may correspond to the maximum speed. However, it is not limited thereto. For example, the other portion 1024 of the second time interval 1020 may be different from the maximum speed. For example, as indicated by arrow 1093, the display driver circuit 320 may display the second image on the display panel 340 within the other portion 1024 of the second time interval 1020 by scanning the second image. For example, a display of the second image within the other portion 1024 of the second time interval 1020 may be the at least one second display among the multiple displays. For example, the display of the second image within the other portion 1024 of the second time interval 1020 may be executed to reduce the probability of causing afterimage on the display panel 340. For example, the display driver circuit 320 may execute the display of the second image within the other part 1024 of the second time interval 1020, in order to reduce the afterimage caused on the display panel 340 according to time length from the timing 1022, which is the end timing of the portion 1023 of the second time interval 1023, to timing 1025, which is the end timing of the second time interval 1020.

Referring back to FIG. 9, in operation 905, on a condition that the length is shorter than or equal to the reference, the display driver circuit 320 may execute a single display of the second image on the display panel 340 within the second time interval. For example, since the fact that the length is shorter than or equal to the reference length indicates that the probability of causing afterimage on the display panel 340 is relatively low, the display driver circuit 320 may execute the single display.

In operation 907, the display driver circuit 320 may identify whether the second image is to be maintained within the third time interval next to (subsequent to) the second time interval. For example, operation 907 may correspond to operation 405 of FIG. 4.

For example, the display driver circuit 320 may execute operation 909 based on identifying that the second image is to be maintained within the third time interval, and execute operation 911 based on identifying that the second image is to be changed to a third image within the third time interval.

In operation 909, on a condition that the second image displayed on the display panel 340 is to be maintained within the third time interval, the display driver circuit 320 may store the second image obtained from the processor 310 within the second time interval in the memory 325. For example, the display driver circuit 320 may store the second image in the memory 325, based on obtaining the predetermined signal indicating that the second image is to be maintained within the third time interval from the processor 310 within the first time interval before the second time interval.

In operation 911, on a condition that the second image displayed on the display panel 340 is to be changed to the third image within the third time interval, the display driver circuit 320 may bypass storing the second image obtained from the processor 310 in the memory 325 within the second time interval. For example, the display driver circuit 320 may bypass storing the second image in the memory 325, based on identifying that the predetermined signal is not obtained within the first time interval, or obtaining within the first time interval a predetermined signal indicating that the second image is changed to the third image within the third time interval.

FIG. 9 illustrates an example in which operation 907 is executed after operation 901 is executed, but this is only for convenience of description. For example, operations 901 and 907 may be executed in parallel. For example, operation 907 may be executed before operation 901 is executed. For example, the display driver circuit 320 may execute at least one second display among the multiple displays and store the second image to display the second image within the third interval when the length is longer than the reference length and the second image is to be maintained within the third time interval, store the second image to execute the at least one second display when the length is longer than the reference length and the second image is to be changed to the third image within the third time interval, store the second image to display the second image within the third time interval when the length is shorter than or equal to the reference length and the second image is to be maintained within the third time interval, and bypass storing the second image when the length is shorter than or equal to the reference length and the second image is to be changed to the third image within the third time interval.

As described above, the electronic device 300 may store an image in the memory 325 to reduce afterimage caused on the display panel 340.

Figure 11:
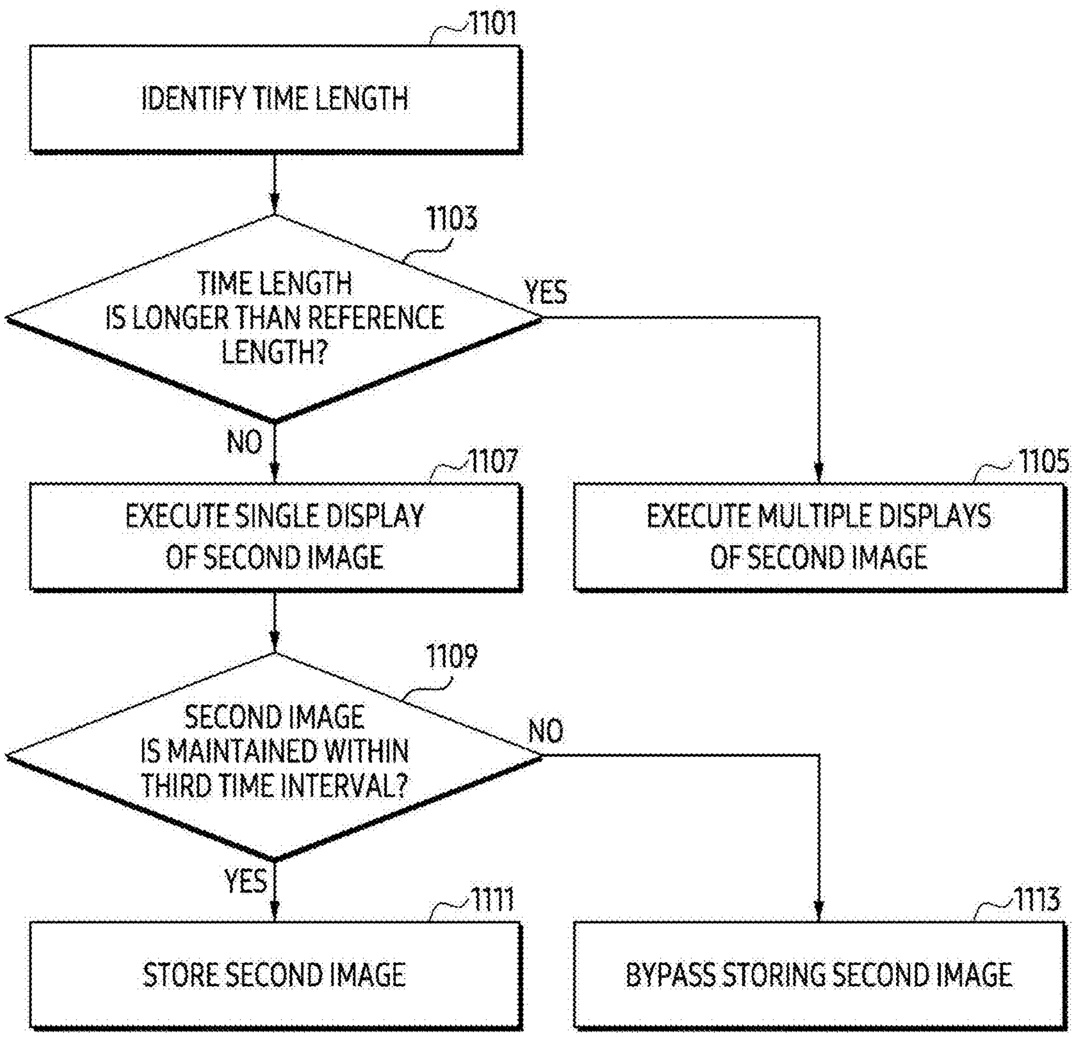
FIG. 11 illustrates an exemplary method of executing a single display of a second image or multiple displays of the second image, according to time length.

FIG. 11 illustrates an exemplary method of executing a single display of a second image or multiple displays of the second image, according to time length. This method may be executed by the display driver circuit 320 of FIG. 3.

Operations 1101 to 1113 of FIG. 11 to be illustrated below illustrate operations executed within the display driver circuit 320 when displaying the second image changed from the first image on the display panel 340 within the second time interval illustrated through the description of FIG. 4, but this is only for convenience of description. Operations 1101 to 1113 of FIG. 11 may also be applied to display the first image on the display panel 340 within the first time interval illustrated through the description of FIG. 4.

Referring to FIG. 11, in operation 1101, the display driver circuit 320 may identify time length between an end timing of a last display of the first image within the first time interval and an initiate timing of a display of the second image within the second time interval. For example, since a probability of causing afterimage due to hysteresis in a driving transistor for driving organic light emitting diode in the display panel 340 may increase as time length from an end timing of displaying an image to an initiate timing of displaying a next (subsequent) image increases, the display driver circuit 320 may identify the time length. The time length will be illustrated in FIG. 10.

In operation 1103, the display driver circuit 320 may identify whether the time length is longer than a reference length. For example, the reference length may be the same as or different from reference length illustrated through the description of FIG. 9. For example, the display driver circuit 320 may execute operation 1105 based on the time length being longer than the reference length, and execute operation 1107 based on the time length being shorter than or equal to the reference length.

In operation 1105, on a condition that the time length is longer than the reference length, the display driver circuit 320 may execute multiple displays of the second image on the display panel 340 within the second time interval. For example, in response to the time length being longer than the reference length, the display driver circuit 320 may display the second image obtained from the processor 310 within a portion of the second time interval on the display panel 340, and store the second image obtained from the processor 310 within the portion of the second time interval in the memory 325. For example, storing the second image in the memory 325 may be executed, independently of whether a predetermined signal indicating that the second image is to be maintained on the display panel 340 within a third time interval next to (subsequent to) the second time interval is obtained from the processor 310. For example, the display driver circuit 320 may display the second image on the display panel 340, by scanning the second image stored in the memory 325 within another portion of the second time interval after the portion of the second time interval. For example, a first display among the multiple displays may be executed based on obtaining the second image from the processor 310 within the portion of the second time interval, and at least one second display (e.g., at least one display next to (subsequent to) the first display) among the multiple displays may be executed based on scanning the second image stored in the memory 325 within the portion of the second time interval. The multiple displays may be illustrated in FIG. 10.

Referring to FIG. 10, the display driver circuit 320 may obtain the second image provided through the interface 315 from the processor 310 based on timing 1021, which is an initiate timing of the second time interval 1020 corresponding to refresh rate for the second image. For example, a state of interface 315 may be indicated such as a state 1000, according to the second image transmitted from the processor 310 to the display driver circuit 320 within the portion 1023 of the second time interval 1020. As a non-limiting example, the portion 1023 of the second time interval 1020 may correspond to maximum speed of transmission of the second image from the processor 310 executed using the interface 315 to the display driver circuit 320. For example, the maximum speed may indicate maximum speed available through the interface 315. For example, as indicated by arrow 1090, the display driver circuit 320 may display the second image obtained from the processor 310 on the display panel 340 within the portion 1023 of the second time interval 1020. For example, a display of the second image within the portion 1023 of the second time interval 1020 may be the first display among the multiple displays.

For example, the display driver circuit 320 may identify time length 1030 to timing 1021 from timing 1031, which is an end timing of a display of the first image, in order to reduce afterimage caused on the display panel 340. For example, as indicated by arrow 1094, the display driver circuit 320 may store the second image obtained from the processor 310 within the portion 1023 of the second time interval 1020 in the memory 325, based on the time length 1030 being longer than the reference length. For example, storing the second image in the memory 325 may be executed, independently of whether a predetermined signal (e.g., the predetermined signal 550 of FIG. 5) is obtained from the processor 310. For example, even when the predetermined signal is not obtained from the processor 310 within the first time interval 1032, the display driver circuit 320 may store the second image in the memory 325 based on the time length 1030 longer than the reference length.

For example, as indicated by arrow 1092, the display driver circuit 320 may scan the second image stored in the memory 325, based on the timing 1022, which is the end timing of the portion 1023 of the second time interval 1020 or the initiate timing of the other portion 1024 of the second time interval 1020. For example, the other portion 1024 of the second time interval 1020 may correspond to the maximum speed. However, it is not limited thereto. For example, the other portion 1024 of the second time interval 1020 may be different from the maximum speed. For example, as indicated by arrow 1093, the display driver circuit 320 may display the second image on the display panel 340 within the other portion 1024 of the second time interval 1020 by scanning the second image. For example, the display of the second image within the other portion 1024 of the second time interval 1020 may be at least one second display among the multiple displays. For example, the display of the second image within the other portion 1024 of the second time interval 1020 may be executed to reduce probability of causing afterimage on the display panel 340.

Referring back to FIG. 11, in operation 1107, the display driver circuit 320 may execute a single display of the second image on the display panel 340 within the second time interval, on a condition that the time length is shorter than or equal to the reference length. For example, since the fact that the time length is shorter than or equal to the reference length indicates that the probability of causing afterimage on the display panel 340 is relatively low, the display driver circuit 320 may execute the single display.

In operation 1109, the display driver circuit 320 may identify whether the second image is to be maintained within the third time interval next to (subsequent to) the second time interval. For example, operation 1109 may correspond to operation 405 of FIG. 4.

For example, the display driver circuit 320 may execute operation 1111 based on the second image to be maintained within the third time interval, and may execute operation 1113 based on the second image to be changed to the third image within the third time interval.

In operation 1111, the display driver circuit 320 may store the second image obtained from the processor 310 within the second time interval in the memory 325, on a condition that the second image displayed on the display panel 340 is to be maintained within the third time interval. For example, based on obtaining the predetermined signal indicating that the second image is to be maintained within the third time interval, the display driver circuit 320 may store the second image in the memory 325 from the processor 310 within the first time interval before the second time interval.

In operation 1113, the display driver circuit 320 may bypass storing the second image obtained from the processor 310 within the second time interval in the memory 325, on a condition that the second image displayed on the display panel 340 is changed to the third image within the third time interval. For example, the display driver circuit 320 may bypass storing the second image in the memory 325, based on identifying that the predetermined signal is not obtained within the first time interval or obtaining a predetermined signal indicating that the second image is changed to the third image within the third time interval.

FIG. 11 illustrates an example in which operation 1109 is executed after operation 1103 is executed, but this is only for convenience of description. For example, operations 1103 and 1109 may be executed in parallel. For example, operation 1109 may be executed before operation 1103 is executed. For example, the display driver circuit 320 may execute at least one second display among the multiple displays and store the second image to display the second image within the third time interval when the time length is longer than the reference length and the second image is to be maintained within the third time interval, store the second image to execute the at least one second display when the time length is longer than the reference length and the second image is to be changed to the third image within the third time interval, store the second image to display the second image within the third time interval when the time length is shorter than or equal to the reference length and the second image is to be maintained within the third time interval, and bypass storing the second image when the time length is shorter than or equal to the reference length and the second image is to be changed to the third image within the third time interval.

As described above, the electronic device 300 may store an image in the memory 325 to reduce the afterimage caused on the display panel 340.

Figure 12:
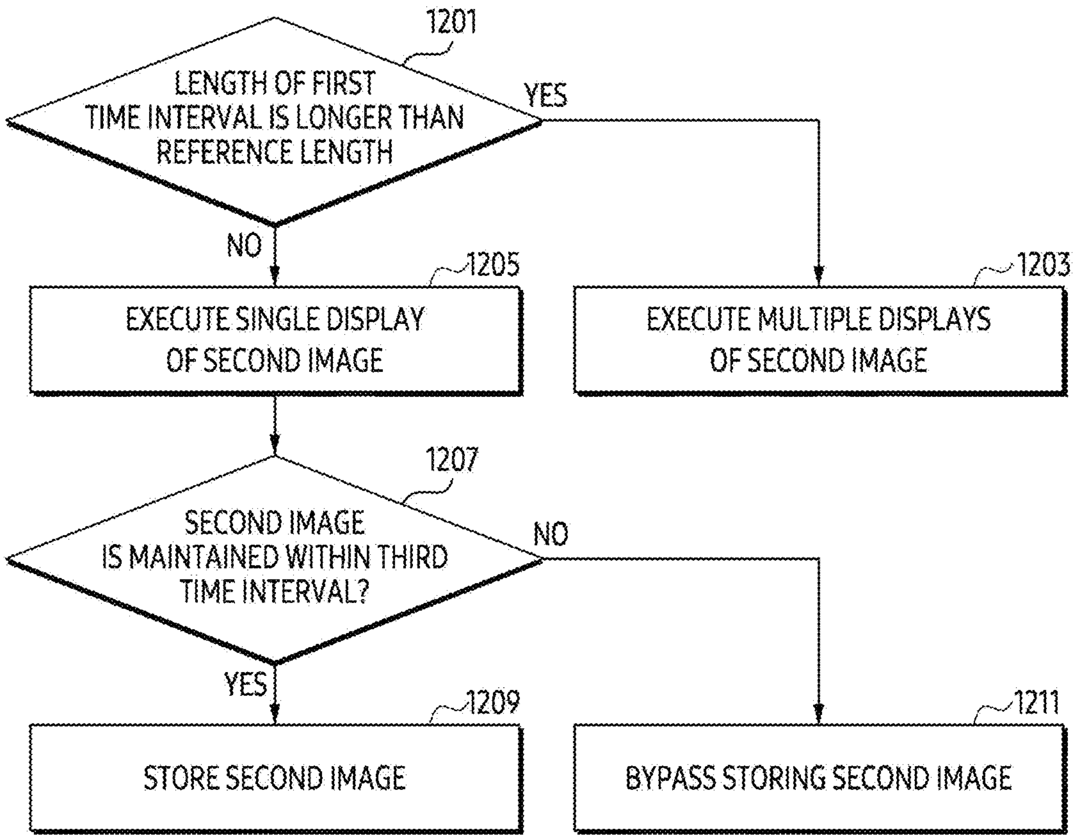
FIG. 12 illustrates an exemplary method of executing a single display of a second image or multiple displays of the second image, according to length of a first time interval.

FIG. 12 illustrates an exemplary method of executing a single display of a second image or multiple displays of the second image, according to length of a first time interval. This method may be executed by the display driver circuit 320 of FIG. 3.

Operation 1201 to operation 1211 of FIG. 12 to be illustrated below illustrate operations executed in the display driver circuit 320 when displaying the second image changed from the first image in the second time interval illustrated through the description of FIG. 4 on the display panel 340, but this is only for convenience of description. Operations 1201 to 1211 of FIG. 12 may also be applied to display the first image on the display panel 340 within the first time interval illustrated through the description of FIG. 4.

Referring to FIG. 12, in operation 1201, the display driver circuit 320 may identify whether length of the first time interval before the second time interval is longer than a reference length. For example, since a probability of causing afterimage due to hysteresis in a driving transistor for driving organic light emitting diode (or sub-pixel) in the display panel 340 may increase as time length from an end timing of displaying an image to an initiate timing of displaying a next (subsequent) image increases, the display driver circuit 320 may identify whether the length is longer than the reference length. For example, the display driver circuit 320 may execute operation 1203 based on the length longer than the reference length, and may execute operation 1205 based on the length shorter than or equal to the reference length.

In operation 1203, on a condition that the length is longer than the reference length, the display driver circuit 320 may execute multiple displays of the second image on the display panel 340 within the second time interval. For example, in response to the length longer than the reference length, the display driver circuit 320 may display the second image obtained from the processor 310 within a portion of the second time interval on the display panel 340 and store the second image obtained from the processor 310 within the portion of the second time interval in the memory 325. For example, storing the second image in the memory 325 may be executed independently of whether a predetermined signal indicating that the second image is maintained on the display panel 340 within the third time interval next to (subsequent to) the second time interval is obtained from the processor 310. For example, the display driver circuit 320 may display the second image on the display panel 340 by scanning the second image stored in the memory 325 within another portion of the second time interval after the portion of the second time interval. For example, a first display among the multiple displays may be executed based on obtaining the second image from the processor 310 within the portion of the second time interval, and at least one second display (e.g., at least one display next to (subsequent to) the first display) among the multiple displays may be executed based on scanning the second image stored in the memory 325 within the portion of the second time interval. The multiple displays may be illustrated in FIG. 10.

Referring to FIG. 10, the display driver circuit 320 may obtain the second image provided through the interface 315 from the processor 310 based on the timing 1021, which is an initiate timing of the second time interval 1020 corresponding to refresh rate for the second image. For example, a state of the interface 315 may be indicated such as the state 1000, according to the second image transmitted from the processor 310 to the display driver circuit 320 within the portion 1023 of the second time interval 1020. As a non-limiting example, the portion 1023 of the second time interval 1020 may correspond to maximum speed of transmission of the second image from the processor 310 executed using the interface 315 to the display driver circuit 320. For example, the maximum speed may indicate maximum speed available through the interface 315. For example, as indicated by arrow 1090, the display driver circuit 320 may display the second image obtained from the processor 310 on the display panel 340 within the portion 1023 of the second time interval 1020. For example, a display of the second image within the portion 1023 of the second time interval 1020 may be the first display among the multiple displays.

For example, the display driver circuit 320 may identify a length of the first time interval 1032 before the second time interval 1020 to reduce afterimage caused on the display panel 340. For example, as indicated by arrow 1095, the display driver circuit 320 may store the second image obtained from the processor 310 in the memory 325 within the portion 1023 of the second time interval 1020, based on the length of the first time interval 1032 being longer than the reference length. For example, storing the second image in the memory 325 may be executed independently of whether a predetermined signal (e.g., the predetermined signal 550 of FIG. 5) is obtained from the processor 310. For example, even when the predetermined signal is not obtained from the processor 310 within the first time interval 1032, the display driver circuit 320 may store the second image in the memory 325 based on the length of the first time interval 1032 being longer than the reference length.

For example, as indicated by arrow 1092, the display driver circuit 320 may scan the second image stored in the memory 325, based on the timing 1022, which is the end timing of the portion 1023 of the second time interval 1020 or the initiate timing of the other portion 1024 of the second time interval 1020. For example, the other portion 1024 of the second time interval 1020 may correspond to the maximum speed. However, it is not limited thereto. For example, the other portion 1024 of the second time interval 1020 may be different from the maximum speed. For example, as indicated by arrow 1093, the display driver circuit 320 may display the second image on the display panel 340 within the other portion 1024 of the second time interval 1020 by scanning the second image. For example, the display of the second image within the other portion 1024 of the second time interval 1020 may be at least one second display among the multiple displays. For example, the display of the second image within the other portion 1024 of the second time interval 1020 may be executed to reduce probability of causing afterimage on the display panel 340.

Referring back to FIG. 12, in operation 1205, the display driver circuit 320 may execute a single display of the second image on the display panel 340 within the second time interval, on a condition that the time length is shorter than or equal to the reference length. For example, since the fact that the time length is shorter than or equal to the reference length indicates that the probability of causing afterimage on the display panel 340 is relatively low, the display driver circuit 320 may execute the single display.

In operation 1207, the display driver circuit 320 may identify whether the second image is to be maintained within the third time interval next to (subsequent to) the second time interval. For example, operation 1207 may correspond to operation 405 of FIG. 4.

For example, the display driver circuit 320 may execute operation 1209 based on the second image to be maintained within the third time interval, and may execute operation 1211 based on the second image to be changed to the third image within the third time interval.

In operation 1209, the display driver circuit 320 may store the second image obtained from the processor 310 within the second time interval in the memory 325, on a condition that the second image displayed on the display panel 340 is to be maintained within the third time interval. For example, based on obtaining the predetermined signal indicating that the second image is to be maintained within the third time interval, the display driver circuit 320 may store the second image in the memory 325 from the processor 310 within the first time interval before the second time interval.

In operation 1211, the display driver circuit 320 may bypass storing the second image obtained from the processor 310 within the second time interval in the memory 325, on a condition that the second image displayed on the display panel 340 is to be changed to the third image within the third time interval. For example, the display driver circuit 320 may bypass storing the second image in the memory 325, based on identifying that the predetermined signal is not obtained within the first time interval or obtaining a predetermined signal indicating that the second image is to be changed to the third image within the third time interval.

FIG. 12 illustrates an example in which operation 1207 is executed after operation 1201 is executed, but this is only for convenience of description. For example, operations 1201 and 1207 may be executed in parallel. For example, operation 1207 may be executed before operation 1201 is executed. For example, the display driver circuit 320 may execute at least one second display among the multiple displays and store the second image to display the second image within the third time interval when the time length is longer than the reference length and the second image is to be maintained within the third time interval, store the second image to execute the at least one second display when the time length is longer than the reference length and the second image is to be changed to the third image within the third time interval, store the second image to display the second image within the third time interval when the time length is shorter than or equal to the reference length and the second image is to be maintained within the third time interval, and bypass storing the second image when the time length is shorter than or equal to the reference length and the second image is to be changed to the third image within the third time interval.

As described above, the electronic device 300 may store an image in the memory 325 to reduce the afterimage caused on the display panel 340.

Figure 13:
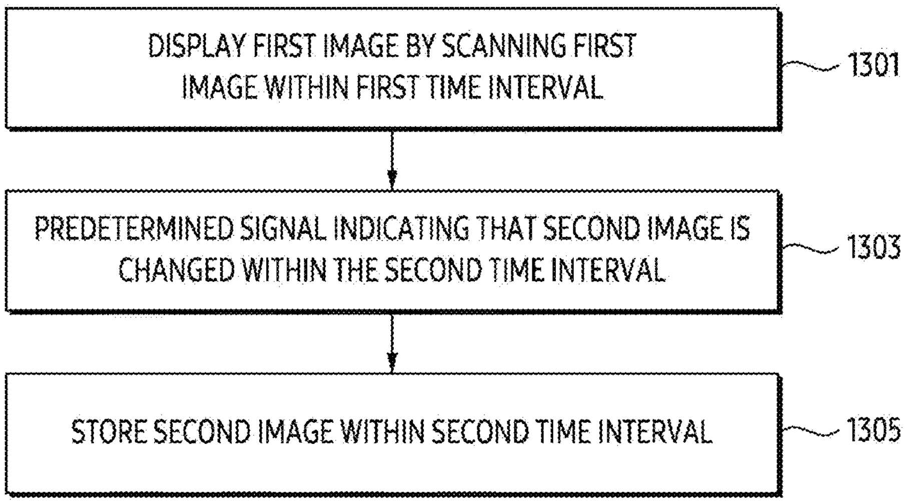
FIG. 13 illustrates an exemplary method of storing a second image within a second time interval, independently of a predetermined signal indicating that the second image displayed within the second time interval is changed to a third image within a third time interval.

FIG. 13 illustrates an exemplary method of storing a second image within a second time interval, independently of a predetermined signal indicating that the second image displayed within the second time interval is changed to a third image within a third time interval.

Referring to FIG. 13, in operation 1301, the display driver circuit 320 may display a first image by scanning the first image within a first time interval. For example, the display driver circuit 320 may display the first image within the first time interval by scanning the first image stored in the memory 325 within a fourth time interval before the first time interval. As a non-limiting example, storing the first image within the fourth time interval may be executed based on obtaining a predetermined signal indicating that the first image is to be maintained within the first time interval from the processor 310 within a fifth time interval before the fourth time interval.

In operation 1303, within the first time interval, the display driver circuit 320 may obtain a predetermined signal from the processor 310 indicating that the second image to be provided from the processor 310 within the second time interval next to (subsequent to) the first time interval is to be changed to the third image within the third time interval next to (subsequent to) the second time interval. For example, the predetermined signal may indicate that the second image obtained from the processor 310 is stored in the memory 325 within the second time interval.

In operation 1305, the display driver circuit 320 may store the second image obtained from the processor 310 within the second time interval in the memory 325, independently of the predetermined signal obtained in operation 1303. As a non-limiting example, the display driver circuit 320 may store the second image in the memory 325 regardless of the predetermined signal, in order to prevent or reduce a display of an image from being interrupted within the third time interval according to failure to obtain the third image from the processor 310 within the third time interval. Storing the second image in the memory 325 independently of the predetermined signal may be illustrated with reference to FIG. 14.

Figure 14:
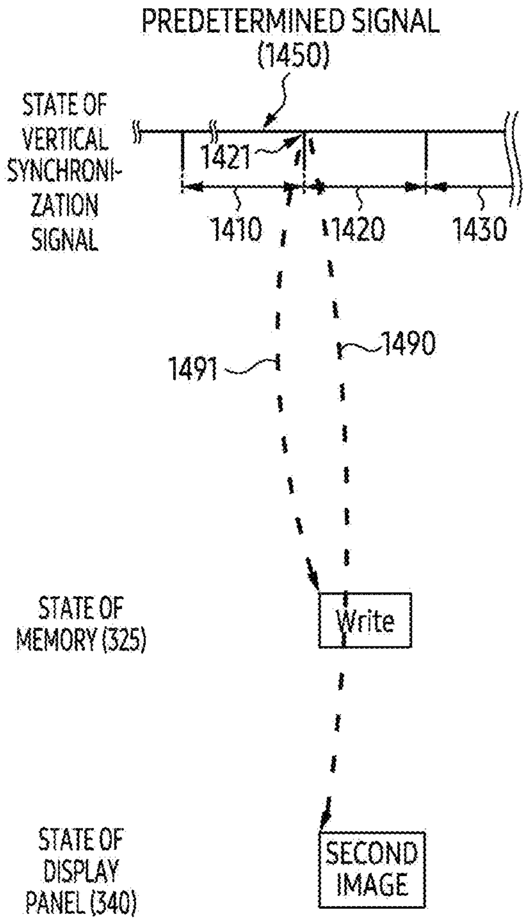
FIG. 14 illustrates an example of storing a second image within a second time interval, independently of a predetermined signal indicating that the second image displayed within the second time interval is changed to a third image within a third time interval.

FIG. 14 illustrates an example of storing a second image within a second time interval, independently of a predetermined signal indicating that the second image displayed within the second time interval is changed to a third image within a third time interval.

Referring to FIG. 14, the display driver circuit 320 may obtain a predetermined signal 1450 from the processor 310 within the first time interval 1410. For example, the predetermined signal 1450 may indicate the second image to be changed to the third image within a third time interval 1430 next to (subsequent to) a second time interval 1420. For example, the predetermined signal 1450 may indicate to bypass or refrain from storing the second image provided from the processor 310 in the memory 325 within the second time interval 1420. For example, the predetermined signal 1450 may be obtained through a front porch portion of a vertical synchronization signal for a display of the second image. However, it is not limited thereto.

For example, the display driver circuit 320 may obtain the second image provided from the processor 310 based on timing 1421, which is an initiate timing of the second time interval 1420. For example, as indicated by arrow 1490, the display driver circuit 320 may display the second image provided by the processor 310 on the display panel 340. For example, as indicated by arrow 1491, the display driver circuit 320 may store the second image provided by the processor 310 in the memory 325. For example, storing the second image in the memory 325 may be performed independently of the predetermined signal 1450. As a non-limiting example, on a condition that the first image before the second image is displayed based on scanning the first image stored in the memory 325 within at least one time interval before the second time interval 1420, the display driver circuit 320 may store the second image in the memory 325, unlike information indicated by the predetermined signal 1450. For example, since a change from the first image to the second image may cause afterimage on the display panel 340, the display driver circuit 320 may store the second image in the memory 325 independently of obtaining the predetermined signal 1450. Although not illustrated in FIG. 14, the display driver circuit 320 may display the second image on the display panel 340 by scanning the second image stored in the memory 325. A display of the second image according to the scan of the second image may be executed within the second time interval 1420 or the third time interval 1430. For example, since the second image may be maintained within the third time interval 1430 unlike the information indicated by the predetermined signal 1450, the display driver circuit 320 may store the second image in the memory 325.

As described above, the electronic device 300 may reduce the power consumed for displaying the image by adaptively storing an image within the second mode in the memory 325 within the display driver circuit 320.

The operations of the display driver circuit 320 that adaptively stores an image from the processor 310 in the memory 325 illustrated through the above descriptions may be executed based on a predetermined signal (e.g., the predetermined signal 550, the predetermined signal 650, and/or the predetermined signal 1450) provided from the processor 310. For example, as in the examples below, the predetermined signal may be provided to the display driver circuit 320 based on the identification (or determination) of the processor 310. In the following descriptions, the predetermined signal may be referred to as a first signal, a second signal, a third signal, and a fourth signal.

Figure 15:
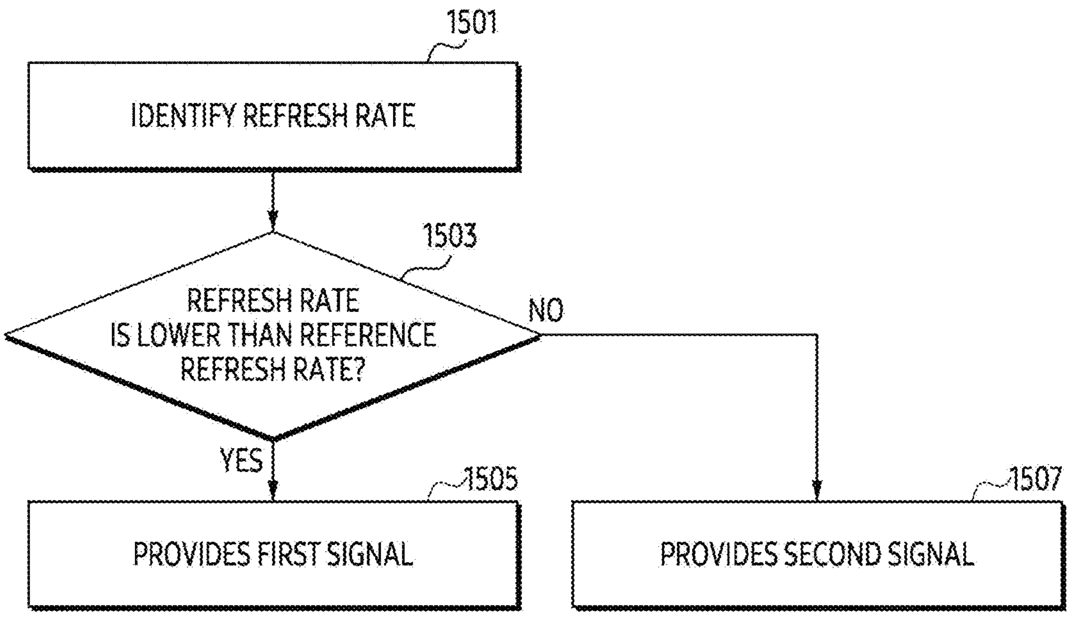
FIG. 15 is a flowchart illustrating an exemplary method of providing a first signal or a second signal according to refresh rate.

FIG. 15 is a flowchart illustrating an exemplary method of providing a first signal or a second signal according to refresh rate.

Referring to FIG. 15, in operation 1501, the processor 310 may identify refresh rate. For example, the refresh rate may indicate refresh rate identified or targeted when the processor 310 obtains or renders an image to be provided to the display driver circuit 320. For example, the refresh rate may correspond to the refresh rate for the first image and the refresh rate for the second image illustrated in the above descriptions.

In operation 1503, the processor 310 may identify whether the refresh rate is lower than a reference refresh rate. For example, the reference refresh rate may be a parameter provided to identify whether to execute a single display of an image or multiple displays of the image within one time interval (e.g., a time interval corresponding to the refresh rate). For example, the fact that the refresh rate is lower than the reference refresh rate may indicate that a probability of occurrence of afterimage when executing the single display of the image within the time interval is relatively high. For example, the fact that the refresh rate is higher than or equal to the reference refresh rate may indicate that the probability of occurrence of the afterimage when executing the single display of the image within the time interval is relatively low. For example, reference refresh rate may be a current refresh rate (e.g., the refresh rate), a threshold refresh rate, or a predetermined refresh rate. For example, the fact that the refresh rate is lower than reference refresh rate may include reducing the refresh rate. For example, the fact that the refresh rate is higher than reference refresh rate may include increasing the refresh rate.

For example, the processor 310 may execute operation 1505 on a condition that the refresh rate is lower than the reference refresh rate, and may execute operation 1507 on a condition that the refresh rate is higher than the reference refresh rate.

In operation 1505, in response to the refresh rate being lower than the reference refresh rate, the processor 310 may provide a first signal (e.g., the sticky flag indication (enable)) indicating that one or more images to be provided from the processor 310 for display on the display panel 340 according to the refresh rate are stored in the memory 325 to the display driver circuit 320. As a non-limiting example, the first signal may be provided from the processor 310 to the display driver circuit 320 through or in a front porch portion of a vertical synchronization signal. As a non-limiting example, the first signal may at least partially correspond to the predetermined signal 550 of FIG. 5.

For example, the first signal may indicate maintaining to store the one or more images in the memory 325 according to the first signal until the second signal to be illustrated in operation 1507 is provided from the processor 310 to the display driver circuit 320. For example, the first signal may indicate that a state of the switch 330 is maintained in the first state 331 until the second signal is provided from the processor 310 to the display driver circuit 320.

Figure 16:
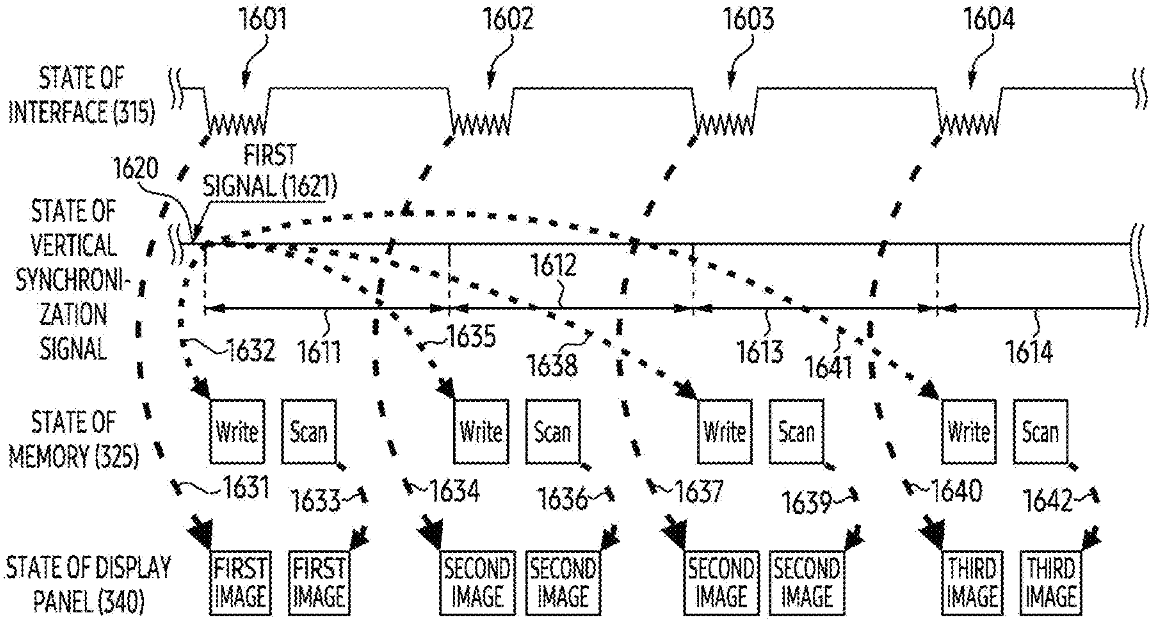
FIG. 16 illustrates an exemplary method of storing one or more images according to a first signal provided based on refresh rate lower than reference refresh rate.

Storing the one or more images according to the first signal may be illustrated in FIG. 16.

FIG. 16 illustrates an exemplary method of storing one or more images according to a first signal provided based on refresh rate lower than reference refresh rate.

Referring to FIG. 16, as indicated by a state 1601, the processor 310 may provide a first image to the display driver circuit 320 through the interface 315 within the first time interval 1611. For example, in response to the refresh rate being lower than the reference refresh rate, the processor 310 may provide a first signal 1621 to the display driver circuit 320 at timing 1620 within a front porch portion of a vertical synchronization signal corresponding to the first time interval 1611. For example, the first signal 1621 may indicate that one or more images provided from the processor 310 to the display driver circuit 320 are stored in the memory 325 until the second signal is provided to the display driver circuit 320. For example, the first signal 1621 may indicate to maintain the switch 330 in the first state 331 until the second signal is provided to the display driver circuit 320.

For example, as indicated by arrow 1631, the display driver circuit 320 may display the first image provided from the processor 310 within the first time interval 1611 on the display panel 340. For example, as indicated by arrow 1632, the display driver circuit 320 may store (or record) the first image provided from the processor 310 within the first time interval 1611 in the memory 325, based on the first signal 1621 obtained at the timing 1620. For example, as indicated by arrow 1633, the display driver circuit 320 may display the first image again on the display panel 340 within the first time interval 1611, by scanning the first image stored in the memory 325. As a non-limiting example, displaying the first image by scanning the first image stored in the memory 325 may be executed to reduce occurrence of afterimage on the display panel 340.

For example, as indicated by the state 1602, the processor 310 may provide the second image to the display driver circuit 320 through the interface 315 within the second time interval 1612 next to (subsequent to) the first time interval 1611.

For example, as indicated by arrow 1634, the display driver circuit 320 may display the second image provided from the processor 310 within the second time interval 1612 on the display panel 340. For example, as indicated by arrow 1635, the display driver circuit 320 may store (or record) the second image provided from the processor 310 within the second time interval 1612 in the memory 325, based on the first signal 1621 obtained at the timing 1620. For example, as indicated by arrow 1636, the display driver circuit 320 may display the second image again on the display panel 340 within the second time interval 1612, by scanning the second image stored in the memory 325. As a non-limiting example, displaying the second image by scanning the second image stored in the memory 325 may be executed to reduce occurrence of afterimage on the display panel 340.

For example, as indicated by the state 1603, the processor 310 may provide the second image again to the display driver circuit 320 through the interface 315 within the third time interval 1613 next to (subsequent to) the second time interval 1612.

For example, as indicated by arrow 1637, the display driver circuit 320 may display the second image provided from the processor 310 within the third time interval 1613 on the display panel 340. For example, as indicated by arrow 1638, the display driver circuit 320 may store (or record) the second image provided from the processor 310 within the third time interval 1613 in the memory 325, based on the first signal 1621 obtained at the timing 1620. For example, the second image provided by the processor 310 within the third time interval 1613 is the same as the second image stored in the memory 325 within the second time interval 1612, but the display driver circuit 320 may store the second image again in the memory 325 based on the first signal 1621. For example, since the fact that an image provided by the processor 310 within the third time interval 1613 is the same as an image stored in the memory 325 may be identified after completing obtaining the image within the third time interval 1613, the display driver circuit 320 may store the second image again in the memory 325. For example, as indicated by arrow 1639, the display driver circuit 320 may display the second image again on the display panel 340 within the third time interval 1613 by scanning the second image stored in the memory 325. As a non-limiting example, displaying the second image by scanning the second image stored in the memory 325 may be executed to reduce occurrence of afterimage on the display panel 340.

For example, as indicated by a state 1604, the processor 310 may provide a third image to the display driver circuit 320 through the interface 315 within a fourth time interval 1614 next to (subsequent to) the third time interval 1613.

For example, as indicated by arrow 1640, the display driver circuit 320 may display the third image provided from the processor 310 within the fourth time interval 1614 on the display panel 340. For example, as indicated by arrow 1641, the display driver circuit 320 may store (or record) the third image provided from the processor 310 within the fourth time interval 1614 in the memory 325, based on the first signal 1621 obtained at the timing 1620. For example, as indicated by arrow 1642, the display driver circuit 320 may display the third image again on the display panel 340 within the fourth time interval 1614 by scanning the third image stored in the memory 325. As a non-limiting example, displaying the third image by scanning the third image stored in memory the 325 may be executed to reduce occurrence of afterimage on the display panel 340.

Although FIG. 16 illustrates that the first image is displayed again by scanning the first image stored in the memory 325 within the first time interval 1611, displaying the first image again by scanning the first image stored in the memory 325 within the first time interval 1611, which is a time interval immediately after the first signal 1621 is obtained, may be bypassed according to time length in which an image before the first image is maintained on the display panel 340. For example, displaying the first image again by scanning the first image within the first time interval 1611 may be bypassed on a condition that the time length is shorter than or equal to a reference length, unlike displaying the second image again by scanning the second image within the second time interval 1612, displaying the second image again by scanning the second image within the third time interval 1613, and displaying the third image again by scanning the third image within the fourth time interval 1614. For example, displaying the first image again by scanning the first image within the first time interval 1611 may be executed, such as displaying the second image again by scanning the second image within the second time interval 1612, displaying the second image again by scanning the second image within the third time interval 1613, and displaying the third image again by scanning the third image within the fourth time interval 1614. However, it is not limited thereto.

As described above, in response to the first signal 1621, the display driver circuit 320 may store each of images (e.g., the first image, the second image, and the third image) obtained from the processor 310 in the memory 325, within each of the first time interval 1611 to the fourth time interval 1614, which are time intervals after the first signal 1621 is obtained.

As described above, the processor 310 may provide the first signal 1621 to the display driver circuit 320, to execute multiple displays of a single image on the display panel 340 during one time interval corresponding to the refresh rate lower than the reference refresh rate. For example, the multiple displays may include a first display and a second display next to (subsequent to) the first display. For example, the display driver circuit 320 may execute the first display by displaying the single image obtained from the processor 310 on the display panel 340 during a portion of the time interval and storing the single image in the memory 325. For example, the display driver circuit 320 may execute the second display, by displaying the single image on the display panel 340 based on scanning the single image stored in the memory 325, during another portion of the time interval. For example, the display driver circuit 320 may bypass executing the second display within an initial time interval (e.g., the first time interval 1611) among a plurality of time intervals (e.g., the first time interval 1611 to the fourth time interval 1614) after the first signal 1621 is obtained. However, it is not limited thereto. As a non-limiting example, whether to execute the second display (or whether to execute the multiple displays) may be identified or determined by the display driver circuit 320 among the processor 310 and the display driver circuit 320, unlike storing an image in the memory 325 according to the first signal 1621.

Referring back to FIG. 15, in operation 1507, in response to the refresh rate being higher than or equal to the reference refresh rate, the processor 310 may provide a second signal (e.g., the stick flag indication (disable)) indicating of bypassing storage of the one or more images in the memory 325 to the display driver circuit 320. As a non-limiting example, the second signal may be provided from the processor 310 to the display driver circuit 320 through or in a front porch portion of a vertical synchronization signal. As a non-limiting example, the second signal may at least partially correspond to the predetermined signal 650 of FIG. 6. As a non-limiting example, a location where the second signal is stored in the display driver circuit 320 may be different from a location where the first signal is stored in the display driver circuit 320. For example, address of the second signal may be different from address of the first signal.

For example, the second signal may indicate that bypassing to store the one or more images in the memory 325 is maintained according to the second signal until the first signal is provided from the processor 310 to the display driver circuit 320. For example, the second signal may indicate that a state of the switch 330 is maintained in the second state 332 until the first signal is provided from the processor 310 to the display driver circuit 320.

Figure 17:
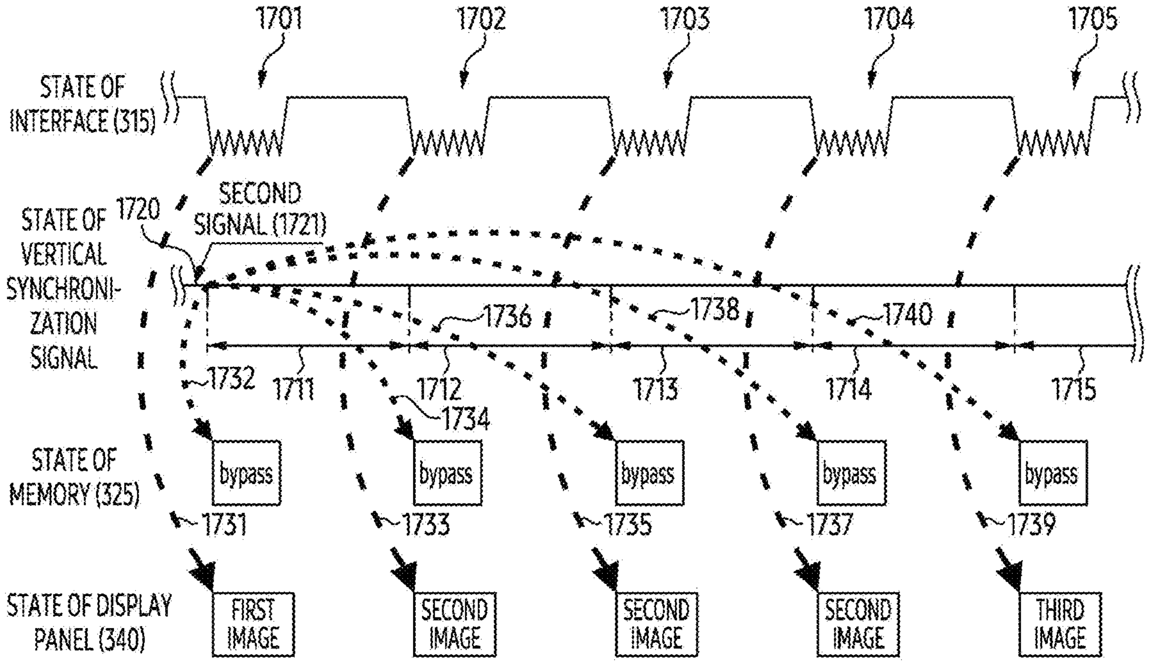
FIG. 17 illustrates an exemplary method of bypassing storing one or more images according to a second signal provided based on refresh rate higher than or equal to reference refresh rate.

Storing the one or more images according to the second signal may be illustrated with FIG. 17.

FIG. 17 illustrates an exemplary method of bypassing storing one or more images according to a second signal provided based on refresh rate higher than or equal to reference refresh rate.

Referring to FIG. 17, as illustrated by a state 1701, the processor 310 may provide a first image to the display driver circuit 320 through the interface 315 within a first time interval 1711. For example, each of the first time interval 1711 to a fifth time interval 1715 to be illustrated through FIG. 17 may be shorter than each of the first time interval 1611 to fourth time interval 1614 illustrated through FIG. 16. However, it is not limited thereto.

For example, in response to the refresh rate being higher than or equal to the reference refresh rate, the processor 310 may provide a second signal 1721 to the display driver circuit 320 at timing 1720 within a front porch portion of a vertical synchronization signal corresponding to the first time interval 1711. For example, the second signal 1721 may indicate that storing one or more images provided to the display driver circuit 320 from the processor 310 in the memory 325 is bypassed until the first signal (e.g., the first signal 1621 of FIG. 16) is provided to the display driver circuit 320. For example, the second signal 1721 may indicate that the switch 330 in the second state 332 is maintained until the first signal (e.g., the first signal 1621) is provided to the display driver circuit 320.

For example, as indicated by arrow 1731, the display driver circuit 320 may display the first image provided from the processor 310 within the first time interval 1711 on the display panel 340. For example, as indicated by arrow 1732, the display driver circuit 320 may bypass storing (or recording) the first image provided from the processor 310 within the first time interval 1711 in the memory 325, based on the second signal 1721 obtained from the timing 1720. For example, since each of the first time interval 1711 to the fifth time interval 1715 is shorter than each of the first time interval 1611 to the fourth time interval 1614, a probability that afterimage occurs on the display panel 340 may be relatively low. For example, since the probability is relatively low, the display driver circuit 320 may execute single display within the first time interval 1711.

For example, as indicated by a state 1702, the processor 310 may provide a second image to the display driver circuit 320 through the interface 315 within the second time interval 1712 next to (subsequent to) the first time interval 1711.

For example, as indicated by arrow 1733, the display driver circuit 320 may display the second image provided from the processor 310 within the second time interval 1712 on the display panel 340. For example, as indicated by arrow 1734, the display driver circuit 320 may bypass storing (or recording) the second image provided from the processor 310 within the second time interval 1712 in the memory 325, based on the second signal 1721 obtained at the timing 1720. For example, since each of the first time interval 1711 to the fifth time interval 1715 is shorter than each of the first time interval 1611 to the fourth time interval 1614, the probability that the afterimage occurs on the display panel 340 may be relatively low. For example, since the probability is relatively low, the display driver circuit 320 may execute single display within the second time interval 1712.

For example, as indicated by state 1703, the processor 310 may provide the second image to the display driver circuit 320 again through the interface 315 within the third time interval 1713 next to (subsequent to) the second time interval 1712. For example, in response to identifying that an image to be changed from the second image does not exist within the third time interval 1713 next to (subsequent to) the second time interval 1712, the processor 310 may provide the second image to the display driver circuit 320 again within the third time interval 1713.

For example, as indicated by arrow 1735, the display driver circuit 320 may display the second image provided from the processor 310 again within the third time interval 1713 on the display panel 340. For example, as indicated by arrow 1736, the display driver circuit 320 may bypass storing (or recording) the second image provided from the processor 310 within the third time interval 1713 in the memory 325, based on the second signal 1721 obtained at the timing 1720. For example, since each of the first time interval 1711 to the fifth time interval 1715 is shorter than each of the first time interval 1611 to the fourth time interval 1614, the probability that the afterimage occurs on the display panel 340 may be relatively low. For example, since the probability is relatively low, the display driver circuit 320 may execute single display within the third time interval 1713.

For example, as indicated by state 1704, the processor 310 may provide the second image to the display driver circuit 320 again through the interface 315 within the fourth time interval 1714 next to (subsequent to) the third time interval 1713. For example, in response to identifying that an image to be changed from the second image does not exist within the fourth time interval 1713 next to (subsequent to) the third time interval 1713, the processor 310 may provide the second image to the display driver circuit 320 again within the fourth time interval 1714.

For example, as indicated by arrow 1737, the display driver circuit 320 may display the second image provided from the processor 310 again within the fourth time interval 1714 on the display panel 340. For example, as indicated by arrow 1738, the display driver circuit 320 may bypass storing (or recording) the second image provided from the processor 310 within the fourth time interval 1714 in the memory 325, based on the second signal 1721 obtained at the timing 1720. For example, since each of the first time interval 1711 to the fifth time interval 1715 is shorter than each of the first time interval 1611 to the fourth time interval 1614, the probability that the afterimage occurs on the display panel 340 may be relatively low. For example, since the probability is relatively low, the display driver circuit 320 may execute single display within the fourth time interval 1714.

For example, as indicated by a state 1705, the processor 310 may provide a third image to the display driver circuit 320 through the interface 315 within the fifth time interval 1715 next to (subsequent to) the fourth time interval 1714.

For example, as indicated by arrow 1739, the display driver circuit 320 may display the third image provided from the processor 310 again within the fifth time interval 1715 on the display panel 340. For example, as indicated by arrow 1740, the display driver circuit 320 may bypass storing (or recording) the third image provided from the processor 310 within the fifth time interval 1715 in the memory 325, based on the second signal 1721 obtained at the timing 1720. For example, since each of the first time interval 1711 to the fifth time interval 1715 is shorter than each of the first time interval 1611 to the fourth time interval 1614, the probability that the afterimage occurs on the display panel 340 may be relatively low. For example, since the probability is relatively low, the display driver circuit 320 may execute single display within the fifth time interval 1715.

As described above, in response to the second signal 1721, the display driver circuit 320 may bypass storing each of images (e.g., the first image, the second image, and the third image) obtained from the processor 310 in the memory 325 within each of the first time interval 1711 to the fifth time interval 1715, which are time intervals after the second signal 1721 is obtained.

As described above, the processor 310 may provide the second signal 1721 to the display driver circuit 320 to execute single display of single image on the display panel 340 during one time interval corresponding to the refresh rate higher than or equal to the reference refresh rate.

Figure 18:
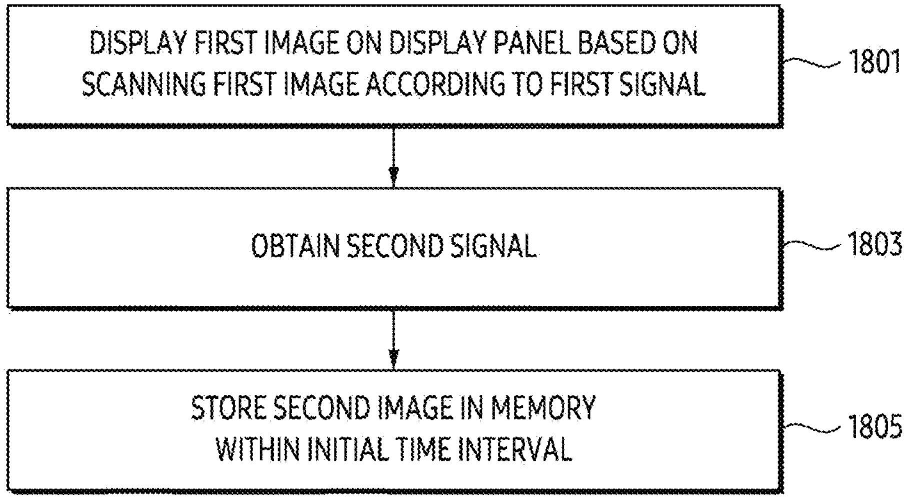
FIG. 18 is a flowchart illustrating an exemplary method of storing an image in a memory within an initial time interval when a second signal is provided after a first signal is provided.

FIG. 18 is a flowchart illustrating an exemplary method of storing an image in a memory within an initial time interval when a second signal is provided after a first signal is provided.

Operations 1801 to 1805 of FIG. 18 may, for example, be executed after operation 1505 of FIG. 15 is executed.

Referring to FIG. 18, in operation 1801, the display driver circuit 320 may display the first image on the display panel 340 based on scanning the first image stored in the memory 325 according to the first signal.

In operation 1803, the display driver circuit 320 may obtain the second signal from the processor 310 after or while the first image is displayed on the display panel 340.

In operation 1805, the display driver circuit 320 may store a second image next to (subsequent to) the first image obtained from the processor 310 within an initial time interval among a plurality of time intervals after the second signal is obtained, independently of the second signal, in the memory 325. Storing the second image in the memory 325 within the initial time interval independently of the second signal may be illustrated in FIG. 19.

Figure 19:
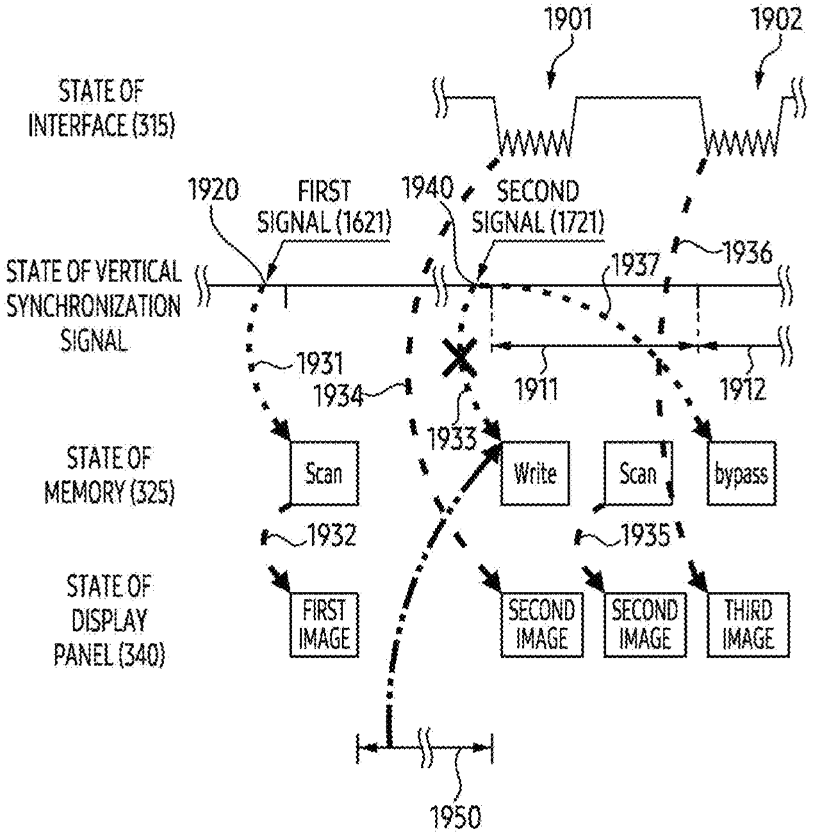
FIG. 19 illustrates an exemplary method of storing an image in a memory within an initial time interval when a second signal is provided after a first signal is provided.

FIG. 19 illustrates an exemplary method of storing an image in a memory within an initial time interval when a second signal is provided after a first signal is provided.

Referring to FIG. 19, the processor 310 may provide the first signal 1621 to the display driver circuit 320 at timing 1920. For example, the display driver circuit 320 may display the first image on the display panel 340 as indicated by the arrow 1932, based on scanning the first image stored in the memory 325 according to the first signal 1621 as indicated by the arrow 1931.

For example, while the first image is maintained on the display panel 340, the processor 310 may provide the second signal 1721 to the processor 310 at timing 1940. For example, as indicated by a state 1901, the processor 310 may provide a second image to the display driver circuit 320 through the interface 315 within the first time interval 1911.

For example, the display driver circuit 320 may store the second image in the memory 325 within the first time interval 1911 despite the second signal 1721 obtained at the timing 1940, as indicated by arrow 1933. For example, in order to reduce occurrence of afterimage on the display panel 340 according to a change from the first image to the second image, the display driver circuit 320 may store the second image in the memory 325, independently of (or regardless of) obtaining the second signal 1721 from the timing 1940. For example, based on the second signal 1721 obtained after the first signal 1621, the display driver circuit 320 may refrain from applying a setting (e.g., operation that bypasses storing an image in the memory 325) according to the second signal 1721 to the first time interval 1911 immediately after a timing when the second signal 1721 is obtained. However, it is not limited thereto.

For example, as indicated by arrow 1934, the display driver circuit 320 may display the second image obtained from the processor 310 within the first time interval 1911 on the display panel 340. For example, as indicated by arrow 1935, the display driver circuit 320 may display the second image on the display panel 340 by scanning the second image stored in the memory 325 within the first time interval 1911. For example, displaying the second image on the display panel 340 by scanning the second image may be executed, in order to reduce afterimage that may be caused according to a change from the first image to the second image.

For example, as indicated by a state 1902, the processor 310 may provide a third image to the display driver circuit 320 through the interface 315 within the second time interval 1912 next to (subsequent to) the first time interval 1911.

For example, as indicated by arrow 1936, the display driver circuit 320 may display the third image provided from the processor 310 within the second time interval 1912 on the display panel 340. For example, as indicated by arrow 1937, the display driver circuit 320 may bypass storing the third image provided from the processor 310 within the second time interval 1912 in the memory 325, based on the second signal 1721 obtained at the timing 1940. For example, the display driver circuit 320 may operate according to the second signal 1721 within the second time interval 1912, unlike the first time interval 1911.

For example, whether to store the second image in the memory 325 within the first time interval 1911 despite the second signal 1721 may be identified according to a time length 1950 in which the first image before the second image is maintained on the display panel 340. For example, the display driver circuit 320 may identify the time length 1950 in response to the second signal 1721 obtained from the processor 310 at the timing 1940. For example, in response to the time length 1950 being longer than reference length, the display driver circuit 320 may store in the memory 325 the second image next to (subsequent to) the first image obtained from the processor 310 within an initial time interval (e.g., the first time interval 1911) among a plurality of time intervals after the second signal 1721 is obtained. The second image may be displayed on the display panel 340 by scanning the second image stored in the memory 325 within the initial time interval (e.g., the first time interval 1911). For example, in response to the time length 1950 being shorter than or equal to the reference length, the display driver circuit 320 may bypass storing the second image in the memory 325 within the initial time interval, unlike illustrated in FIG. 19. For example, since the fact that the time length is shorter than or equal to the reference length indicates that a probability of afterimage caused by a change from the first image to the second image is relatively low, the display driver circuit 320 may operate according to the setting (e.g., operation that bypassing storing an image in the memory 325) according to the second signal 1721.

Unlike the first signal 1621 and the second signal 1721 illustrated through FIGS. 15 to 19, the processor 310 may provide a third signal (e.g., the on-the-fly indication (or the on-the-fly indication (enable)) applied to one time interval to the display driver circuit 320. For example, unlike the first signal and the second signal that may be applied to two or more time interval, the third signal may be provided from the processor 310 to the display driver circuit 320 to control operation of the display driver circuit 320 within one time interval. For example, the third signal may be provided from the processor 310 to the display driver circuit 320 to store the image provided from the processor 310 to the display driver circuit 320 in the memory 325 within the time interval. For example, in a case that no signal among the first signal, the second signal, and the third signal is obtained from the processor 310 after obtaining the third signal, the display driver circuit 320 may bypass storing an image provided from the processor 310 to the display driver circuit 320 in the memory 325, within another time interval next to (subsequent to) the time interval. For example, in response to the third signal obtained after the first signal, the display driver circuit 320 may store an image provided by the processor 310 within the time interval in the memory 325, and refrain from or bypass storing an image provided from the processor 310 to the display driver circuit 320 in the memory 325 according to the first signal within another time interval next to (subsequent to) the time interval. For example, the third signal may be used to set a state of the switch 330 within the time interval to a first state 331 and a state of the switch 330 within the next (subsequent) time interval to the second state 332.

As a non-limiting example, a location where the third signal is stored in the display driver circuit 320 may be different from a location where each of the first signal and the second signal is stored in the display driver circuit 320. For example, an address of the third signal may be different from address of each of the first signal and the second signal. Operations according to the third signal may be illustrated in FIG. 20.

Figure 20:
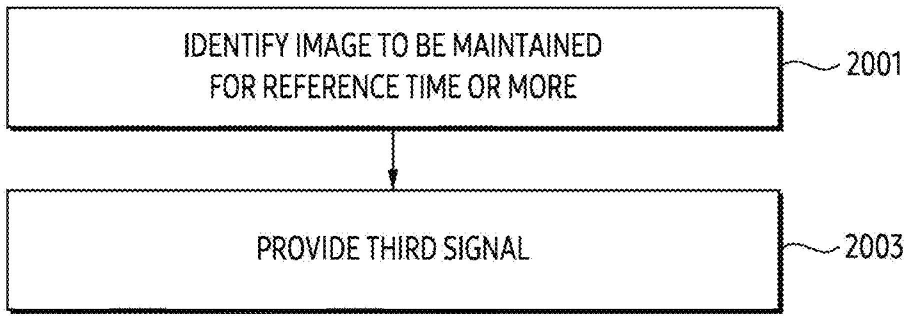
FIG. 20 is a flowchart illustrating an exemplary method of providing a third signal.

FIG. 20 is a flowchart illustrating an exemplary method of providing a third signal.

Referring to FIG. 20, in operation 2001, the processor 310 may identify an image to be maintained on the display panel 340 for a reference time or more. For example, the processor 310 may identify that the image is maintained above the reference time, based on identifying that an image next to (subsequent to) the image to be provided to the display driver circuit 320 is not obtained or rendered. For example, the processor 310 may identify the image to reduce refresh rate shown on the display panel 340 or refresh rate within the display panel 340. However, it is not limited thereto.

In operation 2003, in response to the above image, the processor 310 may provide a third signal (e.g., the on-the-fly indication (or the on-the-fly indication (enable)) for the image to the display driver circuit 320, indicating that the image to be provided from the processor 310 for a display on the display panel 340 is stored in the memory 325.

Figure 21:
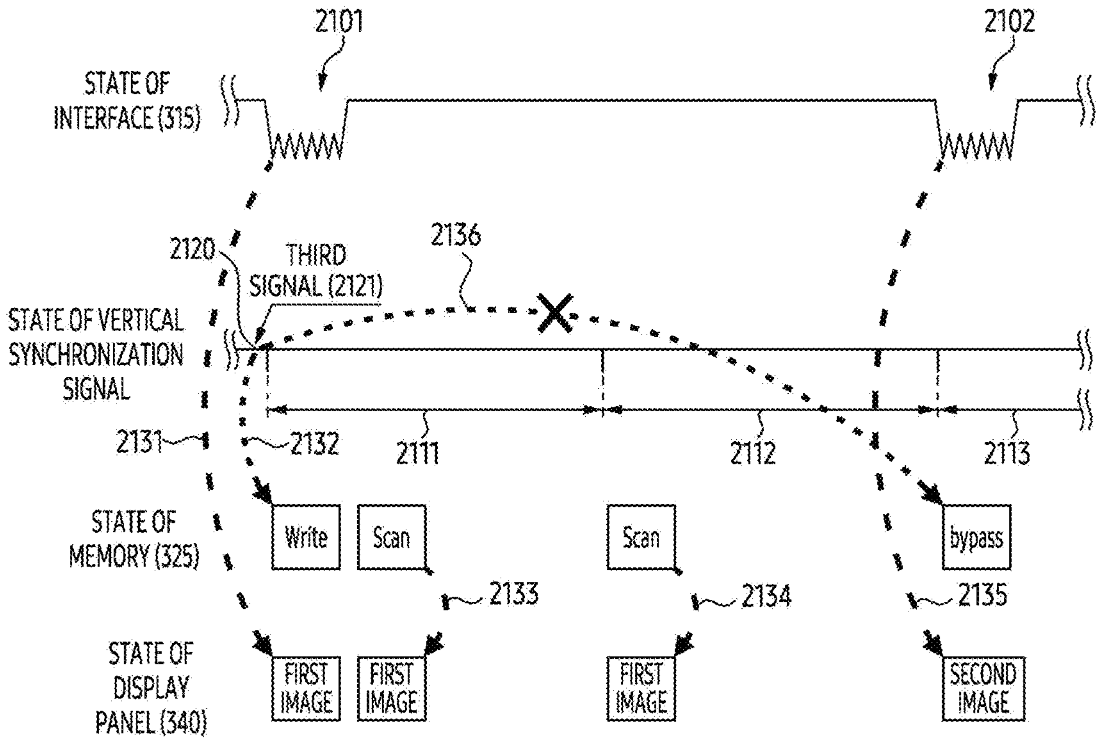
FIG. 21 illustrates an exemplary method of storing an image according to a third signal.

Operations of the display driver circuit 320 according to the third signal may be illustrated in FIG. 21.

FIG. 21 illustrates an exemplary method of storing an image according to a third signal.

Referring to FIG. 21, as shown by a state 2101, the processor 310 may provide a first image to the display driver circuit 320 through the interface 315 within the first time interval 2111. For example, in response to the first image to be maintained for more than a reference time on the display panel 340, the processor 310 may provide a third signal 2121 to the display driver circuit 320 at timing 2120 within a front porch portion of a vertical synchronization signal corresponding to the first time interval 2111. For example, unlike the first signal 1621, the third signal 2121 may indicate that storing the first image in the memory 325 within the first time interval 2111 and bypassing to store an image provided from the processor 310 within at least one time interval next to (subsequent to) the first time interval 2111. For example, unlike the first signal 1621, the third signal 2121 may be provided only for storing the first image in the memory 325.

For example, as indicated by arrow 2131, the display driver circuit 320 may display the first image provided from the processor 310 within the first time interval 2111 on the display panel 340. For example, as indicated by arrow 2132, the display driver circuit 320 may store (or record) the first image provided from the processor 310 within the first time interval 2111 in the memory 325, based on the third signal 2121 obtained at the timing 2120. For example, as indicated by arrow 2133, the display driver circuit 320 may display the first image again on the display panel 340 within the first time interval 2111 by scanning the first image stored in the memory 325. As a non-limiting example, displaying the first image by scanning the first image stored in the memory 325 may be executed to reduce occurrence of afterimage on the display panel 340.

For example, as indicated by arrow 2134, the display driver circuit 320 may display the first image on the display panel 340 by scanning the first image stored in the memory 325 within the second time interval 2112 next to (subsequent to) the first time interval 2111. For example, a length of the second time interval 2112 may correspond to a length of the first time interval 2111. However, it is not limited thereto. Unlike illustrated in FIG. 21, the length of the second time interval 2112 may be longer than the length of the first time interval 2111 to gradually reduce refresh rate shown on the display panel 340.

For example, as indicated by a state 2102, the processor 310 may provide a second image to the display driver circuit 320 through the interface 315 within the third time interval 2113.

For example, as indicated by arrow 2135, the display driver circuit 320 may display the second image provided from the processor 310 within the third time interval 2113 on the display panel 340. For example, since the third signal 2121 obtained from the processor 310 at the timing 2120 is not applied to the third time interval 2113 unlike the first signal 1621, the display driver circuit 320 may bypass storing the second image in the memory 325 within the third time interval 2113, as indicated by arrow 2136. Although not illustrated in FIG. 21, as indicated by arrow 2136, even when the first signal 1621 is obtained from the processor 310 before the third signal 2121 is obtained at the timing 2120, the display driver circuit 320 may bypass storing the second image in memory the 325 within the third time interval 2113.

Referring back to FIG. 20, the processor 310 may provide the third signal to the display driver circuit 320 at a timing later than a timing identified that an image to be provided to the display driver circuit 320 is maintained on the display panel 340 for a reference time or more. Delaying providing the third signal may be illustrated through FIG. 22.

Figure 22:
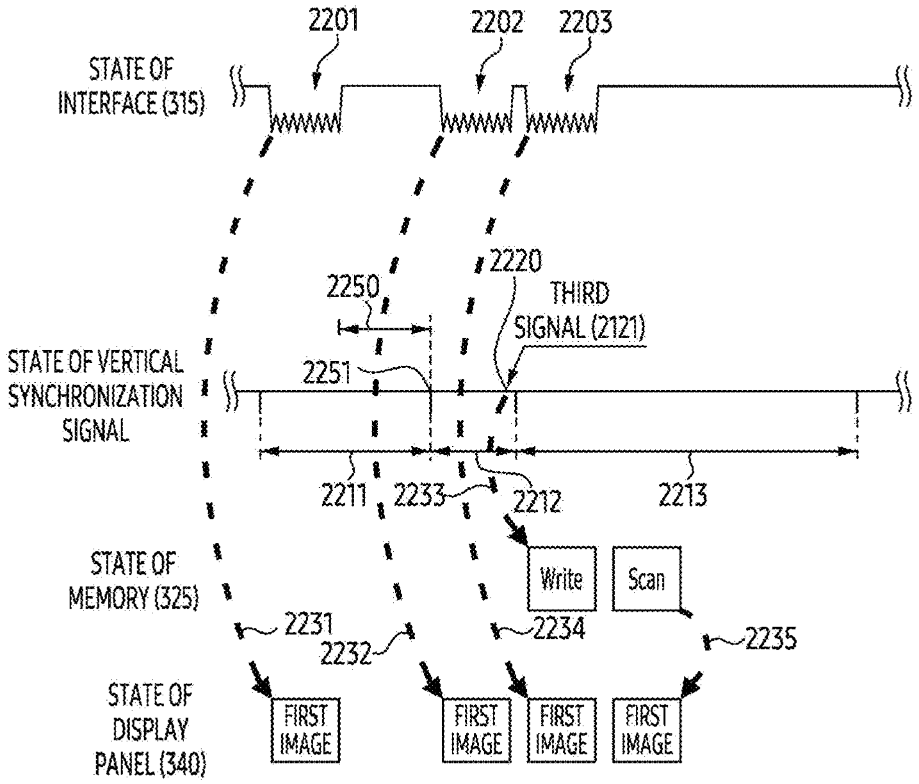
FIG. 22 illustrates an exemplary method of delaying displaying an image.

FIG. 22 illustrates an exemplary method of delaying displaying an image.

Referring to FIG. 22, as illustrated by the state 2201, the processor 310 may provide a first image to be newly displayed on the display panel 340 within a first time interval 2211 to the display driver circuit 320 through the interface 315.

For example, as indicated by arrow 2231, the display driver circuit 320 may display the first image obtained from the processor 310 within the first time interval 2211 on the display panel 340.

For example, as indicated by a state 2202, the processor 310 may provide the first image to the display driver circuit 320 again through the interface 315 within the second time interval 2212. For example, even when the processor 310 identifies that the first image is to be maintained within the second time interval 2212 within a portion 2250 of the first time interval 2211, the processor 310 may provide the first image again to the display driver circuit 320 from an initiate timing 2251 of the second time interval 2212, in order to display a second image different from the first image within the portion 2250 of the first time interval 2211. For example, the first image provided again to the display driver circuit 320 may be an image to reduce afterimage. For example, a first display among multiple displays of the first image may be executed after the portion 2250 of the first time interval 2211.

For example, as indicated by arrow 2232, the display driver circuit 320 may display again the first image obtained from the processor 310 on the display panel 340 within the second time interval 2212.

For example, in response to identifying that the first image is to be maintained for more than the reference time within the second time interval 2212, the processor 310 may provide a third signal 2121 to the display driver circuit 320 at a timing 2220 within the front porch portion of the vertical synchronization signal. For example, as indicated by a state 2203, the processor 310 may provide the first image to the display driver circuit 320 again through the interface 315 within a third time interval 2213, after the third signal 2121 is provided.

For example, as indicated by arrow 2234, the display driver circuit 320 may display again the first image obtained from the processor 310 on the display panel 340 within the third time interval 2213. For example, as indicated by arrow 2233, the display driver circuit 320 may store the first image obtained from the processor 310 in the memory 325 within the third time interval 2213.

For example, as indicated by arrow 2235, the display driver circuit 320 may display the first image again on the display panel 340 within the third time interval 2213 by scanning the first image stored in the memory 325. As a non-limiting example, displaying the first image by scanning the first image stored in the memory 325 may be executed to reduce occurrence of afterimage on the display panel 340. However, it is not limited thereto. For example, displaying the first image by scanning the first image may not be executed within the third time interval 2213 according to identification (or determination) of the display driver circuit 320.

Although not illustrated with reference to the drawings, the processor 310 may provide a fourth signal (e.g., the on-the-fly indication (disable)) opposite to the third signal, indicating that bypassing storing the image provided to the display driver circuit 320 in the memory 325 to the display driver circuit 320. For example, the display driver circuit 320 may bypass storing an image provided by the processor 310 in the memory 325 within a time interval immediately after the fourth signal is received, based on the fourth signal. For example, the processor 310 may provide the fourth signal for the second image to the display driver circuit 320, after the first image is displayed on the display panel 340 based on scanning the first image stored in the memory 325 according to the first signal. For example, the display driver circuit 320 may store the second image in the memory 325 independently of the fourth signal. For example, the display driver circuit 320 may identify time length in which the first image is maintained on the display panel, in response to the fourth signal. For example, in response to the time length being longer the reference length, the display driver circuit 320 may display the second image again on the display panel, by displaying the second image obtained from the processor on the display panel within a time interval for the second image, storing the second image in the memory within the time interval, and scanning the second image stored in the memory within the time interval. For example, in response to time length being shorter than or equal to the reference length, the display driver circuit 320 may display the second image from the processor on the display panel within the time interval, and bypass storing the second image in the memory within the time interval. For example, the fourth signal may indicate a setting, which indicates that bypassing storing an image in the memory 325. According to embodiments, the fourth signal may not be defined in the electronic device 300.

FIG. 23 is a block diagram illustrating an electronic device 2301 in a network environment 2300 according to various embodiments. Referring to FIG. 23, the electronic device 2301 in the network environment 2300 may communicate with an electronic device 2302 via a first network 2398 (e.g., a short-range wireless communication network), or at least one of an electronic device 2304 or a server 2308 via a second network 2399 (e.g., a long-range wireless communication network). According to an embodiment, the electronic device 2301 may communicate with the electronic device 2304 via the server 2308. According to an embodiment, the electronic device 2301 may include a processor 2320, memory 2330, an input module 2350, a sound output module 2355, a display module 2360, an audio module 2370, a sensor module 2376, an interface 2377, a connecting terminal 2378, a haptic module 2379, a camera module 2380, a power management module 2388, a battery 2389, a communication module 2390, a subscriber identification module (SIM) 2396, or an antenna module 2397. In some embodiments, at least one of the components (e.g., the connecting terminal 2378) may be omitted from the electronic device 2301, or one or more other components may be added in the electronic device 2301. In some embodiments, some of the components (e.g., the sensor module 2376, the camera module 2380, or the antenna module 2397) may be implemented as a single component (e.g., the display module 2360).

The processor 2320 may execute, for example, software (e.g., a program 2340) to control at least one other component (e.g., a hardware or software component) of the electronic device 2301 coupled with the processor 2320, and may perform various data processing or computation. According to an embodiment, as at least part of the data processing or computation, the processor 2320 may store a command or data received from another component (e.g., the sensor module 2376 or the communication module 2390)

in volatile memory 2332, process the command or the data stored in the volatile memory 2332, and store resulting data in non-volatile memory 2334. According to an embodiment, the processor 2320 may include a main processor 2321 (e.g., a central processing unit (CPU) or an application processor (AP)), or an auxiliary processor 2323 (e.g., a graphics processing unit (GPU), a neural processing unit (NPU), an image signal processor (ISP), a sensor hub processor, or a communication processor (CP)) that is operable independently from, or in conjunction with, the main processor 2321. For example, when the electronic device 2301 includes the main processor 2321 and the auxiliary processor 2323, the auxiliary processor 2323 may be adapted to consume less power than the main processor 2321, or to be specific to a specified function. The auxiliary processor 2323 may be implemented as separate from, or as part of, the main processor 2321.

The auxiliary processor 2323 may control at least some of functions or states related to at least one component (e.g., the display module 2360, the sensor module 2376, or the communication module 2390) among the components of the electronic device 2301, instead of the main processor 2321 while the main processor 2321 is in an inactive (e.g., sleep) state, or together with the main processor 2321 while the main processor 2321 is in an active state (e.g., executing an application). According to an embodiment, the auxiliary processor 2323 (e.g., an image signal processor or a communication processor) may be implemented as part of another component (e.g., the camera module 2380 or the communication module 2390) functionally related to the auxiliary processor 2323. According to an embodiment, the auxiliary processor 2323 (e.g., the neural processing unit) may include a hardware structure specified for artificial intelligence model processing. An artificial intelligence model may be generated by machine learning. Such learning may be performed, e.g., by the electronic device 2301 where the artificial intelligence is performed or via a separate server (e.g., the server 2308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 2330 may store various data used by at least one component (e.g., the processor 2320 or the sensor module 2376) of the electronic device 2301. The various data may include, for example, software (e.g., the program 2340) and input data or output data for a command related thererto. The memory 2330 may include the volatile memory 2332 or the non-volatile memory 2334.

The program 2340 may be stored in the memory 2330 as software, and may include, for example, an operating system (OS) 2342, middleware 2344, or an application 2346.

The input module 2350 may receive a command or data to be used by another component (e.g., the processor 2320) of the electronic device 2301, from the outside (e.g., a user) of the electronic device 2301. The input module 2350 may include, for example, a microphone, a mouse, a keyboard, a key (e.g., a button), or a digital pen (e.g., a stylus pen).

The sound output module 2355 may output sound signals to the outside of the electronic device 2301. The sound output module 2355 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 2360 may visually provide information to the outside (e.g., a user) of the electronic device 2301. The display module 2360 may include, for example, a display, a hologram device, or a projector and control circuitry to control a corresponding one of the display, hologram device, and projector. According to an embodiment, the display module 2360 may include a touch sensor adapted to detect a touch, or a pressure sensor adapted to measure the intensity of force incurred by the touch.

The audio module 2370 may convert a sound into an electrical signal and vice versa. According to an embodiment, the audio module 2370 may obtain the sound via the input module 2350, or output the sound via the sound output module 2355 or a headphone of an external electronic device (e.g., an electronic device 2302) directly (e.g., wiredly) or wirelessly coupled with the electronic device 2301.

The sensor module 2376 may detect an operational state (e.g., power or temperature) of the electronic device 2301 or an environmental state (e.g., a state of a user) external to the electronic device 2301, and then generate an electrical signal or data value corresponding to the detected state. According to an embodiment, the sensor module 2376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more specified protocols to be used for the electronic device 2301 to be coupled with the external electronic device (e.g., the electronic device 2302) directly (e.g., wiredly) or wirelessly. According to an embodiment, the interface 2377 may include, for example, a high definition multimedia interface (HDMI), a universal serial bus (USB) interface, a secure digital (SD) card interface, or an audio interface.

A connecting terminal 2378 may include a connector via which the electronic device 2301 may be physically connected with the external electronic device (e.g., the electronic device 2302). According to an embodiment, the connecting terminal 2378 may include, for example, a HDMI connector, a USB connector, a SD card connector, or an audio connector (e.g., a headphone connector).

The haptic module 2379 may convert an electrical signal into a mechanical stimulus (e.g., a vibration or a movement) or electrical stimulus which may be recognized by a user via tactile sensation or kinesthetic sensation. According to an embodiment, the haptic module 2379 may include, for example, a motor, a piezoelectric element, or an electric stimulator.

The camera module 2380 may capture a still image or moving images. According to an embodiment, the camera module 2380 may include one or more lenses, image sensors, image signal processors, or flashes.

The power management module 2388 may manage power supplied to the electronic device 2301. According to one embodiment, the power management module 2388 may be implemented as at least part of, for example, a power management integrated circuit (PMIC).

The battery 2389 may supply power to at least one component of the electronic device 2301. According to an embodiment, the battery 2389 may include, for example, a primary cell which is not rechargeable, a secondary cell which is rechargeable, or a fuel cell.

The communication module 2390 may support establishing a direct (e.g., wired) communication channel or a wireless communication channel between the electronic device 2301 and the external electronic device (e.g., the electronic device 2302, the electronic device 2304, or the server 2308) and performing communication via the established communication channel. The communication module 2390 may include one or more communication processors that are operable independently from the processor 2320 (e.g., the application processor (AP)) and supports a direct (e.g., wired) communication or a wireless communication. According to an embodiment, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module or a power line communication (PLC) module). A corresponding one of these communication modules may communicate with the external electronic device via the first network 2398 (e.g., a short-range communication network, such as Bluetooth™, wireless-fidelity (Wi-Fi) direct, or infrared data association (IrDA)) or the second network 2399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2392 may identify and authenticate the electronic device 2301 in a communication network, such as the first network 2398 or the second network 2399, using subscriber information (e.g., international mobile subscriber identity (IMSI)) stored in the subscriber identification module 2396.

The wireless communication module 2392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2392 may support a high-frequency band (e.g., the mm Wave band) to achieve, e.g., a high data transmission rate. The wireless communication module 2392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2392 may support various requirements specified in the electronic device 2301, an external electronic device (e.g., the electronic device 2304), or a network system (e.g., the second network 2399). According to an embodiment, the wireless communication module 2392 may support a peak data rate (e.g., 20 Gbps or more) for implementing eMBB, loss coverage (e.g., 2364 dB or less) for implementing mMTC, or U-plane latency (e.g., 0.5 ms or less for each of downlink (DL) and uplink (UL), or a round trip of 23 ms or less) for implementing URLLC.

The antenna module 2397 may transmit or receive a signal or power to or from the outside (e.g., the external electronic device) of the electronic device 2301. According to an embodiment, the antenna module 2397 may include an antenna including a radiating element composed of or including a conductive material or a conductive pattern formed in or on a substrate (e.g., a printed circuit board (PCB)). According to an embodiment, the antenna module 2397 may include a plurality of antennas (e.g., array antennas). In such a case, at least one antenna appropriate for a communication scheme used in the communication network, such as the first network 2398 or the second network 2399, may be selected, for example, by the communication module 2390 (e.g., the wireless communication module 2392) from the plurality of antennas. The signal or the power may then be transmitted or received between the communication module 2390 and the external electronic device via the selected at least one antenna. According to an embodiment, another component (e.g., a radio frequency integrated circuit (RFIC)) other than the radiating element may be additionally formed as part of the antenna module 2397.

According to various embodiments, the antenna module 2397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2301 and the external electronic device 2304 via the server 2308 coupled with the second network 2399. Each of the electronic devices 2302 or 2304 may be a device of a same type as, or a different type, from the electronic device 2301. According to an embodiment, all or some of operations to be executed at the electronic device 2301 may be executed at one or more of the external electronic devices 2302, 2304, or 2308. For example, if the electronic device 2301 should perform a function or a service automatically, or in response to a request from a user or another device, the electronic device 2301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2301. The electronic device 2301 may provide the outcome, with or without further processing of the outcome, as at least part of a reply to the request. To that end, a cloud computing, distributed computing, mobile edge computing (MEC), or client-server computing technology may be used, for example. The electronic device 2301 may provide ultra low-latency services using, e.g., distributed computing or mobile edge computing. In an embodiment, the external electronic device 2304 may include an internet-of-things (IoT) device. The server 2308 may be an intelligent server using machine learning and/or a neural network. According to an embodiment, the external electronic device 2304 or the server 2308 may be included in the second network 2399. The electronic device 2301 may be applied to intelligent services (e.g., smart home, smart city, smart car, or healthcare) based on 5G communication technology or IoT-related technology.

FIG. 24 is a block diagram 2400 illustrating the display module 2360 according to various embodiments. Referring to FIG. 24, the display module 2360 may include a display 2410 and a display driver integrated circuit (DDI) 2430 to control the display 2410. The DDI 2430 may include an interface module 2431, memory 2433 (e.g., buffer memory), an image processing module 2435, or a mapping module 2437. The DDI 2430 may receive image information that contains image data or an image control signal corresponding to a command to control the image data from another component of the electronic device 2301 via the interface module 2431. For example, according to an embodiment, the image information may be received from the processor 2320 (e.g., the main processor 2321 (e.g., an application processor)) or the auxiliary processor 2323 (e.g., a graphics processing unit) operated independently from the function of the main processor 2321. The DDI 2430 may communicate, for example, with touch circuitry 2350 or the sensor module 2376 via the interface module 2431. The DDI 2430 may also store at least part of the received image information in the memory 2433, for example, on a frame by frame basis. The image processing module 2435 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 2410. The mapping module 2437 may generate a voltage value or a current value corresponding to the image data pre-processed or post-processed by the image processing module 2435. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 2410 may be driven, for example, based at least in part on the voltage value or the current value such that visual information (e.g., a text, an image, or an icon) corresponding to the image data may be displayed via the display 2410.

According to an embodiment, the display module 2360 may further include the touch circuitry 2450. The touch circuitry 2450 may include a touch sensor 2451 and a touch sensor IC 2453 to control the touch sensor 2451. The touch sensor IC 2453 may control the touch sensor 2451 to sense a touch input or a hovering input with respect to a certain position on the display 2410. To achieve this, for example, the touch sensor 2451 may detect (e.g., measure) a change in a signal (e.g., a voltage, a quantity of light, a resistance, or a quantity of one or more electric charges) corresponding to the certain position on the display 2410. The touch circuitry 2450 may provide input information (e.g., a position, an area, a pressure, or a time) indicative of the touch input or the hovering input detected via the touch sensor 2451 to the processor 2320. According to an embodiment, at least part (e.g., the touch sensor IC 2453) of the touch circuitry 2450 may be formed as part of the display 2410 or the DDI 2430, or as part of another component (e.g., the auxiliary processor 2323) disposed outside the display module 2360.

According to an embodiment, the display module 2360 may further include at least one sensor (e.g., a fingerprint sensor, an iris sensor, a pressure sensor, or an illuminance sensor) of the sensor module 2376 or a control circuit for the at least one sensor. In such a case, the at least one sensor or the control circuit for the at least one sensor may be embedded in one portion of a component (e.g., the display 2410, the DDI 2430, or the touch circuitry 2350)) of the display module 2360. For example, when the sensor module 2376 embedded in the display module 2360 includes a biometric sensor (e.g., a fingerprint sensor), the biometric sensor may obtain biometric information (e.g., a fingerprint image) corresponding to a touch input received via a portion of the display 2410. As another example, when the sensor module 2376 embedded in the display module 2360 includes a pressure sensor, the pressure sensor may obtain pressure information corresponding to a touch input received via a partial or whole area of the display 2410. According to an embodiment, the touch sensor 2451 or the sensor module 2376 may be disposed between pixels in a pixel layer of the display 2410, or over or under the pixel layer.

As described above, an electronic device 300 may include a display panel 340, a display driver circuit 320 operably coupled to the display panel 340 and including a memory 325, and processor 310 operably coupled to the display driver circuit 320. According to an embodiment, the display driver circuit 320 may be configured to display a first image obtained from the processor 310 on the display panel 340 within a first time interval. According to an embodiment, the display driver circuit 320 may be configured to store the first image obtained from the processor 310 within the first time interval in the memory 325, based on the first image to be maintained on the display panel 340 within a second time interval next to (subsequent to) the first time interval. According to an embodiment, the display driver circuit 320 may be configured to bypass storing the first image within the first time interval, based on the first image to be changed to a second image within the second time interval.

According to an embodiment, the display driver circuit 320 may be configured to maintain the first image displayed on the display panel 340 within the second time interval, by scanning the first image stored in the memory 325 within the second time interval. According to an embodiment, the processor 310 may be configured to refrain from providing the first image to the display driver circuit 320 within the second time interval.

According to an embodiment, the display driver circuit 320 may be configured to display the second image obtained from the processor 310 within the second time interval on the display panel 340.

According to an embodiment, storing the first image in the memory 325 may be initiated from a timing identified by the processor 310 among the processor 310 and the display driver circuit 320.

According to an embodiment, the display driver circuit 320 may be configured to identify whether a predetermined signal is obtained from the processor 310 within a third time interval before the first time interval. According to an embodiment, the display driver circuit 320 may be configured to store the first image in the memory 325 within the first time interval, based on the third time interval in which the predetermined signal is obtained. According to an embodiment, the display driver circuit 320 may be configured to bypass storing the first image in the memory 325 within the first time interval, based on the third time interval in which the predetermined signal is not obtained. According to an embodiment, the processor 310 may be configured to provide the predetermined signal to the display driver circuit 320 within the third time interval through multiple transmissions.

According to an embodiment, the display driver circuit 320 may be configured to store the first image in the memory 325 by connecting the memory 325 and the processor 310 through a switch 330 of the electronic device 300 within the first time interval. According to an embodiment, the display driver circuit 320 may be configured to bypass storing the first image in the memory 325 by disconnecting the processor 310 from the memory 325 through the switch within the first time interval.

According to an embodiment, the processor 310 may be configured to provide, to the display driver circuit 320, a signal in which the third time interval having a length longer than each of the plurality of time intervals is indicated as a time interval next to (subsequent to) the plurality of time intervals, based on identifying that the first image displayed on the display panel 340 is maintained within a plurality of time intervals including the first time interval and the second time interval. According to an embodiment, the display driver circuit 320 may be configured to maintain the first image displayed on the display panel 340 within the third time interval by scanning the first image stored in the memory 325 within the third time interval.

According to an embodiment, the display driver circuit 320 may be configured to execute multiple displays of the second image on the display panel 340 within the second time interval, based on a length of the second time interval longer than a reference length. According to an embodiment, the first display among the multiple displays may be executed based on obtaining the second image from the processor 310 within a portion of the second time interval. According to an embodiment, at least one second display next to (subsequent to) the first display among the multiple displays may be executed based on scanning the second image stored in the memory 325 within the portion of the second time interval. According to an embodiment, the display driver circuit 320 may be configured to execute a single display of the second image on the display panel 340 in the second time interval, based on the length shorter than or equal to the reference length. According to an embodiment, the display driver circuit 320 may be configured to store the second image in the memory 325 within the second time interval that executes the single display of the second image, based on the second image to be maintained on the display panel 340 within the third time interval next to (subsequent to) the second time interval. According to an embodiment, the display driver circuit 320 may be configured to bypass storing the second image in the memory 325 within the second time interval that executes the single display of the second image, based on the second image to be changed to a third image within the third time interval.

According to an embodiment, the display driver circuit 320 may be configured to identify time length between an end timing of a display of the first image within the first time interval and an initiate timing of a display of the second image within the second time interval. According to an embodiment, the display driver circuit 320 may be configured to execute multiple displays of the second image on the display panel 340 within the second time interval, based on the time length longer than the reference length. According to an embodiment, a first display among the multiple displays may be executed based on obtaining the second image from the processor 310 within a portion of the second time interval from the initiate timing. According to an embodiment, at least one second display next to (subsequent to) the first display among the multiple displays may be executed based on scanning the second image stored in the memory 325 within the portion of the second time interval.

According to an embodiment, the display driver circuit 320 may be configured to execute a single display of the second image on the display panel 340 within the second time interval based on the time length shorter than or equal to the reference length. According to an embodiment, the display driver circuit 320 may be configured to store the second image in the memory 325 within the second time interval that executes the single display of the second image, based on the second image to be maintained on the display panel 340 within the third time interval next to (subsequent to) the second time interval. According to an embodiment, the display driver circuit 320 may be configured to bypass storing the second image within the second time interval in the memory 325, based on the second image to be changed to the third image within the third time interval.

According to an embodiment, the display driver circuit 320 may be configured to execute multiple displays of the second image on the display panel 340 within the second time interval, based on a length of the first time interval longer than the reference length. According to an embodiment, a first display among the multiple displays may be executed based on obtaining the second image from the processor 310 within the portion of the second time interval. According to an embodiment, at least one second display next to (subsequent to) the first display among the multiple displays may be executed based on scanning the second image stored in the memory 325 within the portion of the second time interval.

According to an embodiment, the display driver circuit 320 may be configured to execute a single display of the second image on the display panel 340 within the second time interval, based on the length shorter than or equal to the reference length. According to an embodiment, the display driver circuit 320 may be configured to store the second image in the memory 325 within the second time interval that executes the single display of the second image, based on the second image to be maintained on the display panel 340 within the third time interval next to (subsequent to) the second time interval. According to an embodiment, the display driver circuit 320 may be configured to bypass storing the second image in the memory 325 within the second time interval that executes the single display of the second image, based on the second image to be changed to the third image within the third time interval.

According to an embodiment, the display driver circuit 320 may be configured to store the first image in the memory 325, while a video mode of a display serial interface (DSI) is provided.

As described above, the electronic device 300 may include a display driver circuit 320 including a switch, a display panel 340, a processor, and a memory 325 operably coupled with the display panel 340 and connectable with the processor 310 through the switch. According to an embodiment, the display driver circuit 320 may be configured to display a first image obtained from the processor 310 on the display panel 340. According to an embodiment, the display driver circuit 320 may be configured to store the first image in the memory 325, based on connecting the processor 310 and the memory 325 through the switch, while the first image is obtained from the processor 310. According to an embodiment, the display driver circuit 320 may be configured to bypass storing the first image in the memory 325, based on disconnecting the memory 325 from the processor 310 through the switch while the first image is obtained from the processor 310.

As described above, an electronic device 300 may comprise a display panel 340, a display driver circuit 320, operably coupled with the display panel 340 and including a memory 325, a processor 310 operably coupled with the display driver circuit 320. According to an embodiment, the processor 310 may be configured to identify refresh rate. According to an embodiment, the processor 310 may be configured to provide, to the display driver circuit 320, a first signal that indicates storing one or more images to be provided from the processor 310 for a display on the display panel 340 according to the refresh rate in the memory 325, according to the identified refresh rate. According to an embodiment, the processor 310 may be configured to provide, to the display driver circuit 320, a second signal that indicates bypassing to store the one or more images in the memory 325, according to the identified refresh rate.

As described above, an electronic device 300 may comprise a display panel 340, a display driver circuit 320, operably coupled with the display panel 340 and including a memory 325, a processor 310 operably coupled with the display driver circuit 320. According to an embodiment, the processor 310 may be configured to identify refresh rate. According to an embodiment, the processor 310 may be configured to provide the first signal that indicates storing one or more images to be provided from the processor 310 for a display on the display panel 340 according to the refresh rate in the memory 325, to the display driver circuit 320 in response to the refresh rate being lower than reference refresh rate. According to an embodiment, the processor 310 may be configured to provide a second signal that indicates bypassing to store the one or more images in the memory 325 to the display driver circuit 320, in response to the refresh rate being higher than or equal to the reference refresh rate.

According to an embodiment, each of the first signal and the second signal may be provided from the processor 310 through or in a front porch portion of a vertical synchronization signal.

According to an embodiment, the display driver circuit 320 may be configured to maintain storing the one or more images in the memory 325 based on the first signal, until obtaining the second signal from the processor 310.

According to an embodiment, the display driver circuit 320 may be configured to maintain bypassing to store the one or more images in the memory 325 based on the second signal, until obtaining the first signal from the processor 310.

According to an embodiment, the processor 310 may be configured to provide the first signal to the display driver circuit 320 to execute multiple displays of a single image on the display panel 340 for a time interval that corresponds to the refresh rate lower than the reference refresh rate. According to an embodiment, the processor 310 may be configured to provide the second signal to the display driver circuit 320 to execute a signal display of the signal image on the display panel 340 for a time interval that corresponds to the refresh rate higher than or equal to the reference refresh rate. According to an embodiment, the multiple displays may include a first display and a second display next to (subsequent to) the first display. According to an embodiment, the display driver circuit 320 may be configured to execute the first display by displaying the single image obtained from the processor 310 on the display panel 340 and storing the single image in the memory 325 for a portion of the time interval corresponding to the refresh rate lower than the reference refresh rate. According to an embodiment, the display driver circuit 320 may be configured to execute the second display by displaying the single image on the display panel 340 based on scanning the signal image stored in the memory 325 for another portion of the time interval corresponding to the refresh rate lower than the reference refresh rate.

According to an embodiment, the display driver circuit 320 may be configured to bypass executing the second display in an initial time interval among a plurality of time intervals after the first signal is obtained, the plurality of time intervals respectively corresponding to the refresh rate lower than the reference refresh rate. According to an embodiment, the display driver circuit 320 may be configured to execute the second display in each of one or more time intervals next to (subsequent to) the initial time interval among the plurality of time intervals.

According to an embodiment, scanning, by using the display driver circuit 320 operated based on the first signal, an image in the memory 325 maintained in two or more time intervals respectively corresponding to the refresh rate lower than the reference refresh rate may be identified by the display driver circuit 320 among the display driver circuit 320 and the processor 310.

According to an embodiment, the processor 310 may be configured to provide, to the display driver circuit 320, the second signal, after a first image is displayed on the display panel 340 based on scanning the first image stored in the memory 325 according to the first signal. According to an embodiment, the display driver circuit 320 may be configured to store, independently from the second signal, a second image next to (subsequent to) the first image in the memory 325, the second image obtained from the processor 310 in an initial time interval among a plurality of time intervals after the second is obtained. According to an embodiment, the display driver circuit 320 may be configured to bypass, based on the second signal, storing an image in the memory 325, the image obtained in each of one or more time intervals next to the initial time interval among the plurality of time intervals.

According to an embodiment, the processor 310 may be configured to provide, to the display driver circuit 320, the second signal, after a first image is displayed on the display panel 340 based on scanning the first image stored in the memory 325 according to the first signal. According to an embodiment, the display driver circuit 320 may be configured to identify time length in which the first image is maintained on the display panel 340, in response to the second signal. According to an embodiment, the display driver circuit 320 may be configured to store a second image next to (subsequent to) the first image obtained from the processor 310 in an initial time interval among a plurality of time intervals after the second signal is obtained in the memory 325 and display the second image on the display panel 340 by scanning the second image stored in the memory 325 in the initial time interval, in response to the time length being longer than reference length. According to an embodiment, the display driver circuit 320 may be configured to bypass storing the second image in the memory 325 in the initial time interval, in response to the time length being shorter than or equal to the reference length.

According to an embodiment, the processor 310 may be configured to identify an image to be maintained for time longer than or equal to reference time on the display panel 340. According to an embodiment, the processor 310 may be configured to provide a third signal for the image to the display driver circuit 320, the third signal indicating to store the image to be provided from the processor 310 for a display on the display panel 340 in the memory 325, in response to the image.

According to an embodiment, the third signal for the image may be provided from the processor 310 through or in a front porch portion of a vertical synchronization signal.

According to an embodiment, an address of the third signal for the image may be different from an address of each of the first signal and the second signal.

According to an embodiment, the display driver circuit 320 may be configured to obtain another image next to (subsequent to) the image from the processor 310, after the third signal is obtained. According to an embodiment, the display driver circuit 320 may be configured to bypass storing the other image in the memory 325. According to an embodiment, the display driver circuit 320 may be configured to bypass storing the other image in the memory 325, by releasing a setting that stores in the memory 325 one or more images obtained from the processor 310 after the image is obtained according to the first signal, in response to the third signal for the image obtained after the first signal is obtained.

According to an embodiment, the processor 310 may be configured to provide, to the display driver circuit 320, a fourth signal that indicates bypassing to store in the memory 325 a second image to be provided from the processor 310 for a display on the display panel 340, after a first image is displayed on the display panel 340 based on scanning the first image stored in the memory 325 according to the first signal. According to an embodiment, the display driver circuit 320 may be configured to store the second image in the memory 325, independently from the fourth signal.

According to an embodiment, the display driver circuit 320 may be configured to identify a time length in which the first image is maintained on the display panel 340, in response to the fourth signal. According to an embodiment, the display driver circuit 320 may be configured to store the second image in the memory 325 in the time interval, and display again on the display panel 340 the second image by scanning the second image stored in the memory 325 in the time interval, in response to the time length longer than reference length, display on the display panel 340 the second image obtained from the processor 310 in a time interval for the second image. According to an embodiment, the display driver circuit 320 may be configured to display the second image obtained from the processor 310 on the display panel 340 and bypass storing the second image in the memory 325 in the time interval, in response to the time length shorter than or equal to the reference length.

According to an embodiment, the display driver circuit 320 may be configured to store in the memory 325 one or more images according to the first signal, while a video mode of display serial interface (DSI) is provided.

According to an embodiment, storing the one or more images in the memory 325 according to the first signal may start from the timing identified by the processor 310 among the processor 310 and the display driver circuit 320.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2340) including one or more instructions that are stored in a storage medium (e.g., internal memory 2336 or external memory 2338) that is readable by a machine (e.g., the electronic device 2301). For example, a processor (e.g., the processor 2320) of the machine (e.g., the electronic device 2301) may invoke at least one of the one or more instructions stored in the storage medium, and execute it, with or without using one or more other components under the control of the processor. This allows the machine to be operated to perform at least one function or operation according to the at least one instruction invoked. The one or more instructions may include a code generated by a compiler or a code executable by an interpreter. The machine-readable storage medium may be provided in the form of a non-transitory storage medium. The term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one processor comprising processing circuitry;

display driver circuitry including memory; and a display panel, wherein the display driver circuitry is configured to:

while storing of an image received from the at least one processor in the memory of the display driver circuitry is activated in accordance with a first command received from the at least one processor, receive, from the at least one processor, a second command for deactivating storing of an image received from the at least one processor in the memory of the display driver circuitry;

in response to a first image received initially from the at least one processor after the second command is received from the at least one processor:

display, via the display panel, the first image by scanning the first image received from the at least one processor, and perform storing of the first image in the memory of the display driver circuitry despite the second command; and in response to a second image received from the at least one processor while displaying the first image via the display panel:

display, via the display panel, the second image by scanning the second image received from the at least one processor, and in accordance with the second command, refrain from storing of the second image in the memory of the display driver circuitry.

2. The electronic device of claim 1, wherein the display driver circuitry is configured to:

before the second command is received from the at least one processor, receive, from the at least one processor, a third image;

in response to receiving the third image:

display, via the display panel, the third image by scanning the third image received from the at least one processor, and based on the first command received from the at least one processor before the third image is received from the at least one processor, perform storing of the third image in the memory of the display driver circuitry;

while the third image is displayed in accordance with the scanning of the third image received from the at least one processor, display again, via the display panel, the third image by scanning the third image stored in the memory of the display driver circuitry;

while displaying of the third image is maintained in accordance with the scanning of the third image stored in the memory of the display driver circuitry, receive, from the at least one processor, the second command; and in response to the first image received initially from the at least one processor after the second command is received from the at least one processor:

display, via the display panel, the first image by scanning the first image received from the at least one processor, and based on a time length in which displaying of the third image is maintained in accordance with the scanning of the third image received from the at least one processor and the scanning of the third image stored in the memory of the display driver circuitry, perform the storing of the first image in the memory of the display driver circuitry despite the second command.

3. The electronic device of claim 2, wherein the display driver circuitry is configured to:

in response to the first image received initially from the at least one processor after the second command is received from the at least one processor:

based on the time length being identified by the display driver circuitry as longer than a threshold time length, perform the storing of the first image in the memory of the display driver circuitry despite the second command, and based on the time length being identified by the display driver circuitry as shorter than the threshold time length, refrain from storing the first image in the memory of the display driver circuitry in accordance with the second command.

4. The electronic device of claim 2, wherein the display driver circuitry is configured to:

based on a refresh rate for displaying the third image, identify the time length.

5. The electronic device of claim 1, wherein the display driver circuitry is configured to:

before the second image is received, display again, via the display panel, the first image by scanning the first image stored in the memory of the display driver circuitry despite the second command.

6. The electronic device of claim 5, wherein the display driver circuitry is configured to:

in response to the displaying of the first image by the scanning of the first image received from the at least one processor, perform the displaying of the first image by scanning the first image stored in the memory of the display driver circuitry despite the second command.

7. The electronic device of claim 1, wherein the second command is received from the at least one processor in a vertical front porch portion of a vertical synchronization signal used for displaying the first image.

8. An electronic device comprising:

at least one processor comprising processing circuitry;

display driver circuitry including memory; and a display panel, wherein the display driver circuitry is configured to:

while storing of an image received from the at least one processor in the memory of the display driver circuitry is activated in accordance with a first command received from the at least one processor, receive, from the at least one processor, a second command, wherein the first command is, until a third command is received from the at least one processor, for activating storing of an image received from the at least one processor in the memory of the display driver circuitry, wherein the second command is for activating only storing of an image initially received from the at least one processor in the memory of the display driver circuitry after the second command is transmitted from the at least one processor to the display driver circuitry, and wherein the third command is for deactivating storing of an image received from the at least one processor in the memory of the display driver circuitry;

in response to a first image received initially from the at least one processor after the second command is received from the at least one processor:

display, via the display panel, the first image by scanning the first image received from the at least one processor, and based on the second command, perform storing of the first image in the memory of the display driver circuitry; and in response to a second image received from the at least one processor while displaying the first image via the display panel:

display, via the display panel, the second image by scanning the second image received from the at least one processor, and based on the second command, refrain from storing of the second image in the memory of the display driver circuitry.

9. The electronic device of claim 8, wherein storing of an image activated in accordance with the first command is deactivated based on receiving the second command.

10. The electronic device of claim 8, wherein storing of an image deactivated in accordance with the third command is activated based on receiving the first or second command.

11. The electronic device of claim 8, wherein storing of an image received from the at least one processor is deactivated unless the first or second commands are additionally received from the at least one processor after an image is stored in the memory of the display driver circuitry in accordance with the second command.

* * * * *